(12) United States Patent
Robinson et al.

(10) Patent No.: US 12,643,559 B2
(45) Date of Patent: Jun. 2, 2026

(54) NETWORK FOR DETECTING EDGE CASES FOR USE IN TRAINING AUTONOMOUS VEHICLE CONTROL SYSTEMS

(71) Applicant: Post Urban IP Limited, Bury St. Edmonds (GB)

(72) Inventors: Luke Anthony William Robinson, Shrewsbury (GB); Vladimir Ceperic, Shrewsbury (GB); Daniel Warner, Shrewsbury (GB)

(73) Assignee: POST URBAN IP LIMITED, Mildenhall (GB)

( * ) Notice: Subject to any disclaimer, the term of this patent is extended or adjusted under 35 U.S.C. 154(b) by 0 days.

(21) Appl. No.: 18/811,340

(22) Filed: Aug. 21, 2024

(65) Prior Publication Data

US 2024/0412038 A1     Dec. 12, 2024

Related U.S. Application Data

(60) Division of application No. 17/610,101, filed as application No. PCT/US2020/060088 on Apr. 8, (Continued)

(51) Int. Cl.
G06N 3/0455        (2023.01)
B60W 40/02        (2006.01)
(Continued)

(52) U.S. Cl.
CPC ............ *B60W 50/04* (2013.01); *B60W 40/02* (2013.01); *B60W 40/09* (2013.01); (Continued)

(58) Field of Classification Search
None
See application file for complete search history.

(56) References Cited

U.S. PATENT DOCUMENTS

2013/0100255 A1* 4/2013 Ohba .................. H04N 13/156
348/47
2015/0078641 A1* 3/2015 Tan .......................... G06T 7/66
382/131
(Continued)

OTHER PUBLICATIONS

Chen et al. "EAD: Elastic-Net Attacks to Deep Neural Networks via Adversarial Examples." 2018. In AAAI-18. pp. 10-17 (Year: 2018).*
(Continued)

*Primary Examiner* — Jeremy L Stanley
*Assistant Examiner* — Asher H. Jablon
(74) *Attorney, Agent, or Firm* — LSIP Law LLC

(57) ABSTRACT

Embodiments relate to the detection of edge cases through application of a neural network to predict future vehicle environment data and identifying an edge case when the prediction error exceeds a given threshold. This allows edge cases to be identified based on unexpected vehicle environmental conditions or conditions that otherwise cause the neural network to make inaccurate predictions. These edge cases can then be utilized to better train machine learning systems, for instance, to train autonomous vehicle control systems. Alternatively, the identification of an edge case can highlight the need for remedial action and can therefore trigger an alert to a vehicle control system to take remedial action. Further methods and systems described herein improve environmental sensing by providing a computationally efficient and accurate means for fusing sensor data and using this fused data to control sensors to focus on areas that would most reduce the uncertainty in the sensing system.

19 Claims, 9 Drawing Sheets

Related U.S. Application Data 2020, now abandoned, which is a continuation-in-part of application No. 16/407,290, filed on May 9, 2019, now abandoned.

(51) Int. Cl.

| | |
|---|---|
| *B60W 40/09* | (2012.01) |
| *B60W 50/02* | (2012.01) |
| *B60W 50/04* | (2006.01) |
| *B60W 60/00* | (2020.01) |
| *G06N 3/045* | (2023.01) |
| *B60W 50/00* | (2006.01) |

(52) U.S. Cl.
CPC .... *B60W 50/0205* (2013.01); *B60W 60/0015* (2020.02); *G06N 3/045* (2023.01); *B60W 2050/0075* (2013.01)

(56) References Cited

U.S. PATENT DOCUMENTS

| | | | |
|---|---|---|---|
| 2018/0018834 A1* | 1/2018 | Walker | G06Q 50/40 |
| 2018/0190313 A1* | 7/2018 | Sadri | G10L 19/00 |
| 2018/0212996 A1* | 7/2018 | Nedeltchev | H04L 67/12 |
| 2019/0135300 A1* | 5/2019 | Gonzalez Aguirre | G06N 20/00 |
| 2019/0232898 A1* | 8/2019 | Hu | B60R 16/0231 |
| 2019/0369241 A1* | 12/2019 | Chen | G03B 13/20 |
| 2020/0349427 A1* | 11/2020 | Sousa | G06N 3/084 |

OTHER PUBLICATIONS

Houthooft et al. "VIME: Variational Information Maximizing Exploration." 2017. arXiv:1605.09674v4 [cs.LG]. 11 pages (Year: 2017).*

* cited by examiner 422                420                424

1

NETWORK FOR DETECTING EDGE CASES FOR USE IN TRAINING AUTONOMOUS VEHICLE CONTROL SYSTEMS

CROSS-REFERENCE TO RELATED APPLICATIONS

This application is a division of U.S. patent application Ser. No. 17/610,101 filed Nov. 9, 2021, which is a 371 of PCT/EP2020/06088 filed Apr. 8, 2020 which is a continuation-in-part of U.S. patent application Ser. No. 16/407,290 filed May 9, 2019.

TECHNICAL FIELD

The present disclosure relates to computer implemented systems and methods for detecting edge cases. In particular, but without limitation, this disclosure relates to methods for detecting edge cases based on environment data detailing one or more observed features of a vehicle environment and outputting an alert in response to the detection of an edge case. Certain embodiments output the alert to an external system (such as a server) for use in training autonomous vehicle control systems based on information relating to the environment data during the edge case. Alternative embodiments output the alert to a vehicle control system to notify the vehicle control system of the edge case in order to allow it to take remedial action.

BACKGROUND

Environmental sensing is an important aspect of control systems engineering. As the number and variety of sensors increases, it is important for control systems to be able to accurately combine sensor data in order to determine an appropriate control action. In addition, the large amount of data being transferred between sensors and central control systems can lead to large transmission and computing overheads.

One field of control systems engineering that is progressing rapidly is control systems for autonomous vehicles. Recent advances in machine learning have led to a number of significant improvements to such autonomous vehicle control systems. Having said this, the large amount of sensor data being provided to such systems, and the need for such systems to operate in real time with very little lag, provide significant technical hurdles.

SUMMARY

Embodiments relate to the detection of edge cases through application of a neural network to predict future vehicle environment data and identifying an edge case when the prediction error exceeds a given threshold. This allows edge cases to be identified based on unexpected vehicle environmental conditions or conditions that otherwise cause the neural network to make inaccurate predictions. These edge cases can then be utilised to better train machine learning systems, for instance, to train autonomous vehicle control systems. Alternatively, the identification of an edge case can highlight the need for remedial action and can therefore trigger an alert to a vehicle control system to take remedial action.

According to an aspect there is provided a computer-implemented method for detecting edge cases, the method comprising: obtaining environment data for a first time detailing one or more observed features of a vehicle environment at the first time; processing the environment data for the first time using a neural network to determine predicted environment data for a second time that is later than the first time; obtaining environment data for the second time detailing one or more observed features of the vehicle environment at the second time; determining a prediction error based on the predicted environment data and the environment data for the second time; and, in response to the prediction error exceeding a threshold, outputting an alert indicating detection of an edge case.

According to an embodiment the alert comprises information detailing the environment data for one or both of the first time and the second time as an edge case for use in training one or more autonomous vehicle control systems; or the alert is to a vehicle control system within the vehicle to adapt to potential danger.

Information detailing environment data may include raw environment data or a compressed representation of environment data. Alternatively or in addition, this information may include additional environment data (for instance, environment data one or more time steps before and/or after the first and second times).

The vehicle environment may be an environment surrounding a vehicle and/or the environment within the vehicle (such as a status of the vehicle and/or driver actions or inputs). The vehicle may be an air, land, or water vehicle. The vehicle may be unmanned or manned. The vehicle control system may be autonomous or semi-autonomous.

According to an embodiment the environment data for the first time further describes one or more observed actions performed by a driver of the vehicle or an autonomous control system of the vehicle at the first time. The predicted environment data for the second time comprises one or more predicted actions to be taken by the driver or autonomous vehicle control system of the vehicle at the second time. The environment data for the second time further details one or more observed actions performed by the driver or autonomous vehicle control system of the vehicle at the second time.

Accordingly, the neural network may predict one or more driver actions and identify an edge case based on the prediction error relative to one or more observed driver actions. This allows the method to identify an edge case based on unexpected driver behaviour.

The one or more observed actions for the first and second times and the one or more predicted actions may comprise one or more of breaking, accelerating, engaging a clutch, turning, indicating and changing gear.

According to an embodiment the alert is to a vehicle control system within the vehicle to adapt to potential danger, wherein the alert comprises the one or more predicted actions. According to a further embodiment the method further comprises predicting one or more emergency actions for adapting to the vehicle environment and wherein the alert is to a vehicle control system within the vehicle comprising the one or more emergency actions.

Accordingly, where the driver is not performing a predicted action (e.g. one to adapt to a dangerous situation) the alert may include a recommendation, suggestion or instruction to the vehicle control system to perform the predicted action or an emergency action, or another action that would assist the predicted action or emergency being implemented. This may include priming breaking (ABS) ahead of a breaking action, priming an engine, gear or other system ahead of acceleration, engaging clutch for a gear change, etc.

Accordingly the vehicle control system can be alerted to a predicted action or emergency action in the event of an edge case and can take the predicted or emergency actions or take one or more actions to assist the predicted action or emergency action, such as adapting a configuration to assist a driver or autonomous vehicle control system.

In one embodiment, the alert suggests a recommended action (e.g. a predicted or emergency action) but control of the vehicle remains with the driver or the vehicle control system. Accordingly, where an autonomous vehicle control system is being implemented, the vehicle control system takes the ultimate decision as to whether to perform the suggested actions. Alternatively, the alert may be an instruction or command to perform action.

According to an embodiment the one or more emergency actions comprise at least one action from a group comprising: adjusting a configuration of, engaging or disengaging a braking system for the vehicle; adjusting a configuration of, engaging or disengaging a steering system for the vehicle; adjusting a configuration of, engaging or disengaging an acceleration system for the vehicle; and adjusting a configuration of, engaging or disengaging one or more external lights or indicators of the vehicle.

According to an embodiment the method is performed in a computing system carried by the vehicle and the alert comprises information detailing the environment data for one or both of the first time and the second time as an edge case for use in training one or more autonomous vehicle control systems, wherein the alert is output by sending the information to a server for further analysis. The information may comprise compressed or raw environment data.

According to an embodiment the output information is utilised to recreate the vehicle environment at the first and second times within a simulator in order to train an autonomous vehicle control system to learn from the edge case. Accordingly, the edge case may be recreated in a simulator to better train autonomous vehicle control systems to safely control vehicles during these edge cases. The server may recreate the vehicle environment or a further computing device may perform this step.

According to an embodiment the method further comprises receiving an updated neural network; obtaining environment data for a third time detailing one or more observed features of a vehicle environment at the third time; processing the environment data for the third time using the updated neural network to determine predicted environment data for a fourth time that is later than the third time; obtaining environment data for the fourth time detailing one or more observed features of the vehicle environment at the fourth time; determining a prediction error based on the predicted data for the fourth time and the environment data for the fourth time; and in response to the prediction error for the fourth time exceeding a threshold, outputting information detailing the environment data for the fourth time as an edge case for further analysis.

Accordingly, the neural network may be trained remotely to reduce the prediction error of the neural network. The trained (updated) neural network may be sent to the vehicle to replace the previous neural network.

According to an embodiment the one or more features of the environment comprise an autonomous vehicle prediction error from an autonomous vehicle control system for the vehicle. This allows the method to monitor the performance of an autonomous vehicle control system and factor in the autonomous vehicle prediction error into the determination of an edge case. This allows edge cases to be identified based on prediction errors for the autonomous vehicle control system itself-thereby better identifying scenarios for which the autonomous vehicle that may require further training.

According to an embodiment the method further comprises training the neural network by updating parameters of the neural network to reduce prediction error. This may be performed locally to the vehicle, in a computing system carried by the vehicle, or may be performed remotely, e.g. at a central server, with updates being sent to the vehicle.

According to an embodiment the environment data for the first time comprises a plurality of observed features for the first time; the predicted environment data for the second time comprises a plurality of sub-predictions for the second time; and the environment data for the second time comprises a plurality of observed features for the second time; and the prediction error comprises a weighted combination of sub-prediction errors, each According to a further aspect there is provided a computing system for detecting edge cases, the computing system comprising one or more processors configured to: obtain environment data for a first time detailing one or more observed features of a vehicle environment at the first time; process the environment data for the first time using a neural network to determine predicted environment data for a second time that is later than the first time; obtain environment data for the second time detailing one or more observed features of the vehicle environment at the second time; determine a prediction error based on the predicted environment data and the environment data for the second time; and, in response to the prediction error exceeding a threshold, output an alert indicating detection of an edge case.

According to a further aspect there is provided a computer readable medium comprising computer executable instructions that, when executed by a processor, cause the processor to: obtain environment data for a first time detailing one or more observed features of a vehicle environment at the first time; process the environment data for the first time using a neural network to determine predicted environment data for a second time that is later than the first time; obtain environment data for the second time detailing one or more observed features of the vehicle environment at the second time; determine a prediction error based on the predicted environment data and the environment data for the second time; and in response to the prediction error exceeding a threshold, output an alert indicating detection of an edge case.

Accordingly computing systems and (transitory or non-transitory) computer readable media may be adapted to implement the methods described herein.

According to an aspect there is provided a computer-implemented method for alerting a vehicle control system to potential danger, the method comprising:
obtaining environment data for a first time detailing one or more observed features of a vehicle environment at the first time; processing the environment data for the first time using a neural network to determine predicted environment data for a second time that is later than the first time; determining whether the predicted environment data indicates a predicted environmental state associated with danger; and, in response to the determining that predicted environment data indicates an environmental state associated with danger, issuing an alert to a vehicle control system to recommend taking remedial action to adapt to the predicted environmental state.

An environmental state associated with danger may be an emergency action such as an emergency brake or steering (e.g. more than a predefined amount of braking or steering). Equally, the environmental state associated with danger might be a high-risk object, wherein the position and velocity of the high-risk object suggests that a collision with the vehicle is likely (or at least, has a higher probability or risk).

According to an embodiment, determining whether the predicted environment data indicates a predicted environmental state associated with danger comprises one or more of: determining that the predicted environment data comprises a predicted emergency action by a driver of the vehicle or the vehicle control system; determining that the predicted environment data indicates a predicted collision with an object external to the vehicle; and determining that the predicted environment data comprises data indicative of a high risk object.

The object external to the vehicle might be another vehicle, an obstacle or a pedestrian. A predicted collision may be based on predicted or measured object trajectories relative to the vehicle. A high risk object may be one of a set of predefined object classes (e.g. people, children, stop signs, etc.).

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
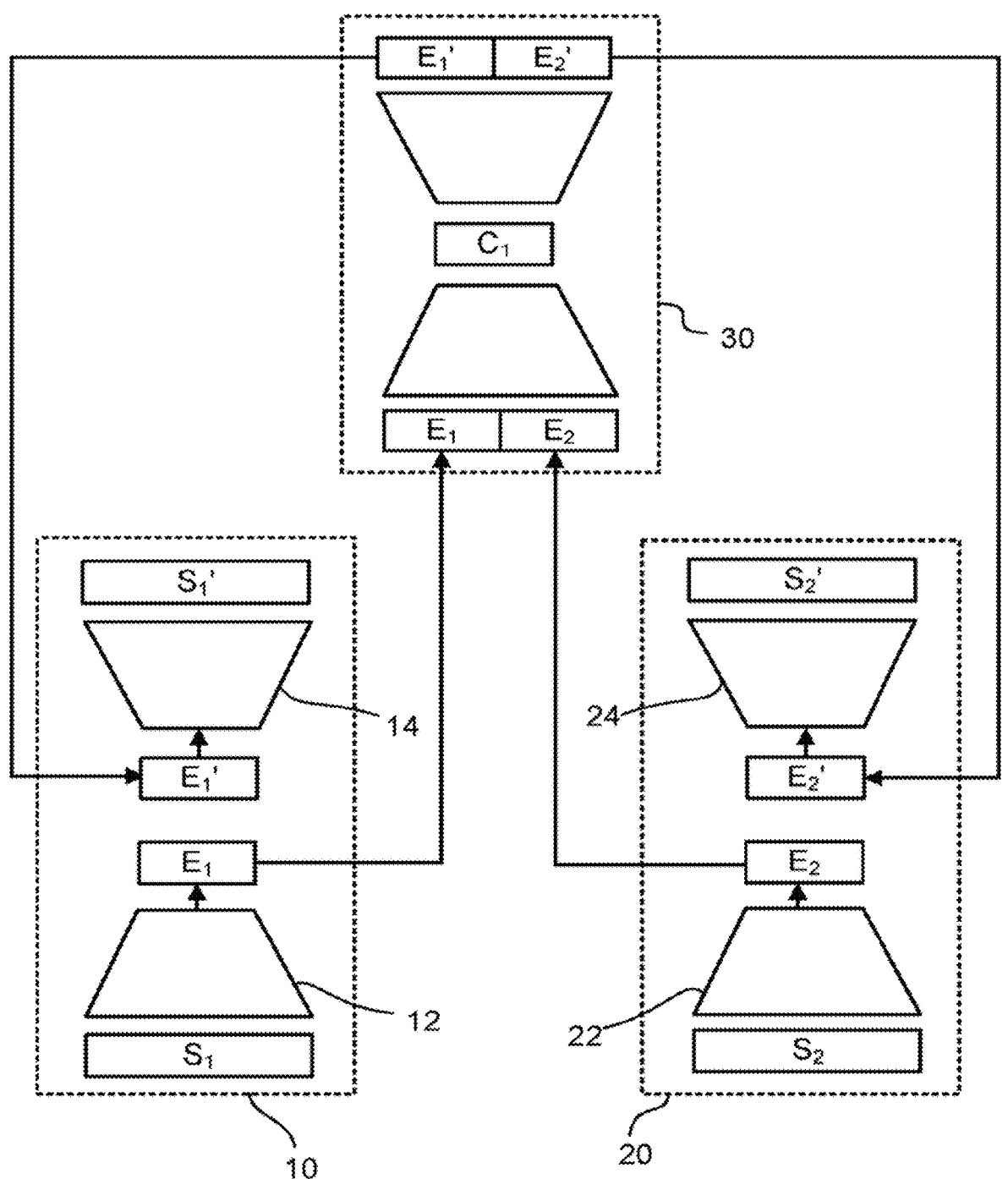
FIG. 1 shows a schematic of a sensor fusion system according to an embodiment.

The first section of the detailed description relates to sensor-action fusion methods for improving sensor data acquisition. The second section of the detailed description relates to methods for improving the detection of edge cases for use in training and/or alerting vehicle control systems. Sensor-Action Fusion System for Optimising Sensor Measurement Collection from Multiple Sensors In light of the above, the embodiments described herein provide the ability to fuse information from a number of sensors and combine this with the means to adjust sensor configurations based on this fused data. This allows each individual sensor to be controlled to improve data acquisition across the whole system based on the combination of data across multiple sensors.

According to a first aspect there is provided a method for controlling the configuration of one or more sensors based on information shared between a plurality of sensors, the method comprising establishing a hierarchical network of nodes comprising at least a first level comprising a plurality of child nodes and a second level comprising one or more parent nodes, wherein each of the child nodes is assigned to a corresponding sensor and each of the one or more parent nodes is assigned to a corresponding group of child nodes to combine sensor data from the corresponding group of child nodes. The method further comprises, at each parent node: receiving from each of the child nodes in the corresponding group of child nodes for the parent node, sensor data for the sensor corresponding to that child node, the sensor data occupying a corresponding sensor feature space for the child node; encoding the received sensor data to form an encoded combination of sensor data by mapping the received sensor data to a latent space for the parent node; decoding the encoded combination of sensor data to map, for each of one or more of the child nodes of the corresponding group, the encoded combination of sensor data to the sensor feature space for the child node to form a corresponding decoded combination of sensor data; and sending each decoded combination of sensor data to the child node corresponding to the sensor feature space for that decoded combination of sensor data. The method further comprises, at each child node that receives a decoded combination of sensor data, determining an action for updating a configuration of the corresponding sensor based on the received decoded combination of sensor data, and issuing an instruction to adjust the configuration of the corresponding sensor in accordance with the action.

Accordingly, in an embodiment a hierarchical network of nodes is provided for controlling one or more sensors based on data from a number of sensors. In the second level, data from a plurality of sensors is combined. In the first level, one or more of the child nodes receives a decoded combination of sensor data from the second level and takes an action to adjust the configuration of the corresponding sensor. The action may be for improving data acquisition by the sensor. This allows the individual sensor to be adjusted based on the information shared across a number of sensors. This provides improved sensing resolution across the system and allows less expensive sensors to be utilised whilst maintaining sensing resolution across the system.

Each node within the hierarchical network of nodes may be configured to encode data by mapping data onto a corresponding latent space via a bottleneck architecture comprising an encoder and a decoder. This may be implemented by a corresponding neural network for the node. The encoder may be configured to map information into a corresponding latent space of reduced dimensions to compress the information. A decoder may be provided to map encoded data out of the corresponding latent space. In this way, each node is able to compress the data effectively to improve the efficiency of the system by reducing the amount of data that is transferred between nodes. The bottleneck architecture also provides a means for combining data at parent nodes.

According to an embodiment the method further comprises at each child node: receiving one or more sensor measurements from the sensor corresponding to the child node; encoding the one or more sensor measurements to compress the one or more sensor measurements by mapping the one or more sensor measurements onto a sensor feature space for the child node to form the sensor data, the sensor feature space being a latent space; and sending the sensor data to the parent node corresponding to the child node.

Encoding data at each child node compresses the data thereby improving the efficiency of the system. The latent space of each child node may have reduced dimensions relative to the one or more sensor measurements. That is, the sensor data provided to the parent node for the child node may be compressed relative to the one or more sensor measurements.

Compression reduces the bandwidth across the system. By training the system to learn an effective latent space for compressing the data, only the most important features need to be shared between nodes.

The first level may comprise one node for each sensor, wherein for each sensor, the sensor data for the sensor is input into a corresponding neural network for encoding.

According to an embodiment each child node that receives a decoded combination of sensor data implements an agent for determining the action that is biased towards selecting an action that achieves one or more of reducing prediction error or focusing on one or more predefined features of interest.

Accordingly, in an embodiment, a machine learning agent is implemented in one or more nodes in the first level for determining actions for updating the configuration of the one or more corresponding sensors. The machine learning agent may be biased to select actions that focus on predefined features of interest (e.g. user defined features) or to reduce prediction error in the system or in the child node itself. The biasing may be through training, by training the agent to choose actions and biasing those actions (through a reward or loss function) accordingly. Whilst the agent may be biased towards one or more features of interest, it could equally be considered to be biased away from features of low importance.

According to an embodiment each child node that receives a decoded combination of sensor data implements a classifier configured to identify the one or more predefined features of interest within the corresponding decoded combination of sensor data and bias the agent towards an action that focuses on the one or more predefined features of interest.

According to a further embodiment wherein each agent: determines predicted sensor data based on the decoded combination of sensor data; determines a prediction error based on the predicted sensor data; and is biased towards an action that minimises a cost function comprising the prediction error.

By minimising a cost function comprising prediction error, each agent can attempt to minimise surprise within the system. It should be noted that minimising a cost function is functionally equivalent to maximising a reward function provided that the terms within each function are adapted accordingly (e.g. by taking the inverse or negative of certain terms).

According to a further embodiment each agent: determines predicted sensor data based on the combination of sensor data, determines the prediction error based on the predicted sensor data and determines a gradient of the prediction error over the action space for the node; and is biased towards determining an action that minimises a cost function comprising the gradient of the prediction error.

By attempting to minimise a cost function comprising the gradient of the prediction error, each agent attempts to direct attention towards areas regions in the environment that provide the greatest increase in knowledge (the greatest decrease in prediction error). Each agent may be biased towards regions in the environment corresponding to the most negative gradient in the prediction error.

According to a further embodiment the action comprises one or more of: adjusting a resolution of the corresponding sensor; adjusting a focus of the corresponding sensor; and directing the corresponding sensors to sense an updated region.

Sensing an updated region may be via an actuator moving the sensor or the sensor configuring itself to adjust its sensitivity in a certain direction (e.g. the adjustment of a phased array of antennas).

According to an embodiment each child node is implemented in a corresponding processor connected directly to the corresponding sensor for that child node. Each child node may be integrated within the corresponding sensor. This reduces the amount of data that is transferred from the sensor, as data may be compressed by the child node prior to it being sent from the child node to the parent node. Directly connecting the child node to the parent reduces transmission overheads and reduces latency within the system.

According to a further embodiment the second level is implemented in a second set of one or more processors and wherein the processors for the first level communicate the sensor data to the one or more processors for the second level.

According to an embodiment, the hierarchical network predicts future sensor measurements based on the sensor data and, in response to a sensor measurement at a specified time differing from a predicted sensor measurement by more than a predefined amount, outputs details of the sensor measurement for validation. This allows potentially erroneous or doctored measurements to be flagged up for evaluation. This can help improve the security of the system by flagging up potential attempts to infiltrate the system and doctor measurements.

According to an embodiment the method further comprises, at each child node that receives a decoded combination of sensor data, determining a bandwidth action to adjust a size of the sensor feature space for the child node based on the received decoded combination of sensor data and adjusting the size of the sensor feature space in accordance with the action.

Adjusting the sensor feature space allows the amount of compression to be varied at each node to improve efficiency. The system may be trained to optimise the bandwidth (the size of each sensor feature space) such that information is shared effectively whilst maintaining efficiency.

According to an embodiment the bandwidth action is biased towards a bandwidth action that reduces the size of the sensor feature space but is biased away from an action that increases a prediction error for the child node According to an aspect there is provided a node for controlling the configuration of a sensor based on information shared between a plurality of sensors, the node comprising a processor configured to: receive one or more sensor measurements from the sensor; encode the one or more sensor measurements to compress the one or more sensor measurements by mapping the one or more sensor measurements onto latent space for the node to form encoded sensor data; send the encoded sensor data to a parent node for combination with further encoded sensor data from one or more other sensors of the plurality of sensors; receive from the parent node a combination of sensor data comprising a combination of the encoded sensor data for the node and the further encoded sensor data from the one or more other sensors mapped to the latent space of the node; determine an action for updating a configuration of the sensor based on the combination of sensor data; and issue an instruction to adjust the configuration of the sensor in accordance with the action.

Accordingly, a single (child) node is able to encode sensor data to compress the sensor data, send the encoded sensor data to a parent node and determine an action for adjusting a configuration based on a combination of encoded sensor data received from the parent node.

According to an embodiment the node is biased towards selecting an action that achieves one or more of reducing prediction error or focusing on one or more predefined features of interest.

According to an embodiment the processor is configured to implement a classifier configured to identify one or more predefined features of interest within the combination of sensor data and bias the node towards an action that focuses on the one or more predefined features of interest.

According to an embodiment the processor is configured to determine predicted sensor data based on the combination of sensor data and determine the prediction error based on the predicted sensor data and the processor is biased towards selecting an action that minimises a cost function comprising the prediction error.

According to an embodiment the processor is configured to determine predicted sensor data based on the combination of sensor data, determine the prediction error based on the predicted sensor data and determine a gradient of the prediction error over the action space for the node and the processor is biased towards determining an action that minimises a cost function comprising the gradient of the prediction error.

According to an embodiment the action comprises one or more of: adjusting a resolution of the sensor; adjusting a focus of the sensor; and directing the sensor to sense an updated region.

According to an embodiment the processor is configured to be connected directly to the sensor for receiving the sensor data.

According to an embodiment the processor is configured to determine a bandwidth action for adjusting the size of the latent space based on the combination of sensor data, wherein the processor is biased towards a bandwidth action that reduces the size of the latent space but is biased away from an action that increases a prediction error for the node.

According to an embodiment the action is determined using a reinforcement learning agent in accordance with parameters of the agent and the processor is configured to update the parameters of the agent to reduce a cost function based on one or more of a prediction error, a gradient of the prediction error over an action space for the node, and a weighting towards one or more predefined features of interest.

According to a further aspect there is provided a parent node for combining sensor data from multiple sensors for use by one or more child nodes in controlling the configuration of one or more of the sensors, the parent node comprising a processor configured to: receive from each of a group of child nodes, sensor data for a sensor corresponding to the child node, the sensor data occupying a corresponding sensor feature space for the child node; encode the received sensor data to form an encoded combination of sensor data by mapping the received sensor data to a latent space for the parent node; decode the encoded combination of sensor data to map, for each of one or more of the child nodes of the group, the encoded combination of sensor data to the sensor feature space for the child node to form a corresponding decoded combination of sensor data; and send each decoded combination of sensor data to the child node corresponding to the sensor feature space for that decoded combination of sensor data to enable the child node to determine and issue an action for updating a configuration of the corresponding sensor for that child node based on the corresponding combination of sensor data.

According to an embodiment there is provided a computing system comprising one or more processors configured to implement any of the methods described herein. According to an embodiment there is provided a non-transitory computer readable medium comprising computer executable instructions that, when executed by a processor, cause the processor to implement any of the methods described herein.

The embodiments described herein aim to improve environmental sensing by providing a computationally efficient and accurate means for fusing sensor data and using this fused data to control sensors to focus on areas that would most reduce the uncertainty in the sensing system. In this way, the system can direct sensors to focus on the most important areas and features within the environment in order to provide the most effective sensor data (e.g. for use by a control system).

The methods described herein make use of multi-agent sensor-action fusion. The methods are multi-agent in that a set of machine learning agents are trained in order to control the sensors to focus on the most important features and regions.

The embodiments implement sensor-action fusion in that sensor fusion is performed in order to obtain a combined view of the environment and this combined view is utilised to determine the most appropriate actions.

Sensor fusion is the combination of data from several sensors. This allows the system to obtain a holistic view of the environment and mitigates the effect of individual errors or faults in individual sensors. It also provides improved resolution relative to independent measurements. This means that less advanced (and correspondingly, less expensive) sensors may be utilised whilst still obtaining the same resolution of data. In the present embodiments, sensor fusion is obtained by encoding sensor data from multiple sensors into a combined latent space.

The systems described herein are configured to sit between the sensors (e.g. a camera or LiDAR) and a machine learning system (such as a control system for an automated vehicle). As the data is encoded into a combined latent space, it is in an ideal format for being processed further by the machine learning system.

The embodiments described herein compress sensor data by encoding the sensor data using specifically trained encoders. The compression reduces the amount of data sent to, and optimises the data for, the machine learning system. Directional feedback loops are provided to focus the sensors on the most important information in the environment. The result is a self-directed, active learning system that maps an environment faster and with higher resolution than alternative methods. This can provide the following advantages:

increased speed of feature detection, machine learning rate and accuracy;

increased resolution of sensors (allowing for simpler, less expensive and more efficient sensors to be utilised); and reduced volume of data sent from sensors to machine learning system. This increases the throughput of the system, reduces the power consumption of both the sensor and the machine learning system and reduces the cost of the machine learning system (due to the decreased computational requirements for the machine learning system).

The embodiments described herein implement a hierarchical network of neural networks (in specific embodiments, these are machine learning agents that each include an encoder to a corresponding latent space and a decoder out of the latent space). Sensor fusion may be performed at a number of levels for various levels of resolution/generality. For instance, the sensor data for an autonomous vehicle may be combined by a processor on a vehicle before being transmitted to a regional controller that combines the sensor data for a number of vehicles. A higher level may be provided for combining data across a number of regions and this may continue up to a global level of generality. This allows the sensor data to be interrogated by one or more control systems at various resolution levels. For instance, a driver or a control system for an automated vehicle may require the combined data for a single car, whereas a control or monitoring system for a fleet of vehicles may require combined data across the fleet. The combined data across multiple vehicles can be fed back to individual vehicles to further improve the data acquisition function at each vehicle.

FIG. 1 shows a schematic of a sensor fusion system according to an embodiment. The system comprises three nodes, a first sensor node 10, a second sensor node 20 and a fusion node 30. Each node is implemented on a separate processor.

The first 10 and second 20 sensor nodes form a first level within the network. The fusion node 30 sits above the sensor nodes 10, 20 in a second level within the network. The fusion node 30 can be considered a parent node and the first 10 and 20 second sensor
nodes can be considered child nodes of the parent node.

The first 10 and second 20 sensor nodes are implemented in processors connected directly to a corresponding sensor. Accordingly, the first sensor node 10 receives first sensor data S1 from a first sensor and the second sensor node 20 receives second sensor data S2 from a second sensor. The first S1 and second S2 sensor data each include one or more sensor measurements.

Each of the first 10 and second 20 sensor nodes is configured to compress its respective sensor data to produce an encoded version of that sensor data. The first sensor node 10 compresses the first sensor data S1 to produce first encoded data E1. The second sensor node 20 compresses the second sensor data S2 to produce second encoded data E2. The first 10 and second 20 sensor nodes compress the sensor data through mapping the sensor data onto a corresponding latent space via a machine learning model such as a neural network. In the present embodiment, this is achieved through the use of specially trained bottleneck architecture comprising an encoder and a corresponding decoder. Each latent space encodes a learned and controllable translation in time, space or level of abstraction (such as bandwidth or compression).

Accordingly, the first 10 and second 20 sensor nodes implement a corresponding encoder to compress input data through a mapping onto a corresponding latent space. Each latent space for each sensor node 10, 20 can be considered a sensor feature space.

Each node includes an encoder 12, 22 and a decoder 14, 24. Each encoder 12, 22 maps input sensor data onto a corresponding latent space. Each decoder 14, 24 maps encoded data back onto the input space of the sensor data to produce decoded sensor data S/, S2'. The decoded sensor data S/, S2' is a prediction of the sensor data based on the encoded data.

Each node may implement an autoencoder, such that the output (the decoded sensor data) attempts to recreate the original input (the sensor data). In this case, each node (each encoder-decoder pair) would be trained in order to minimise the reproduction error (the error between the input data S1, S2 and the decoded data S/, S2'). Having said this, the bottleneck architecture need not be an autoencoder, and alternative architectures may be used that do not attempt to reproduce the original input.

The nodes make use of a bottleneck architecture such that the input data is mapped to a lower dimensional latent space. This may be through defining a lower-dimensional latent space, or through the use of a sparse encoder. Sparse encoders have an embedding space that is larger (has more dimensions) than the input/output; however, a loss function is implemented in order that only a few of the embedded features are used. The dimensions of the bottleneck can be varied by varying the drop-out rate (the loss function) of the sparse encoder.

The size of the bottleneck (the number of dimensions, or the number of encoded features used) can be varied. Generally, the smallest bottleneck is chosen whilst maintaining a given level of accuracy (keeping the reproduction error below a set level). Having said this, the system may adjust the size of each bottleneck in order to optimise the amount of compression. As the amount of compression affects the amount of data transferred between the nodes in the network, this is a form of automatic bandwidth control. This embodiment is described in more detail below.

One or more of the autoencoders may be variational autoencoders (VARs). These encode data as a distribution (e.g. a Gaussian distribution represented by a mean and standard deviation). When decoded, the encoded distribution may be sampled to produce a latent vector that is then passed through the decoder to produce an output. Variational autoencoders may be trained to minimise a loss term which includes the reproduction error (e.g. the mean-squared error) as well as the latent loss which represents how well the variables match a predefined statistical distribution (e.g. the Kullback-Liebler divergence representing the difference between the encoded distribution and a unit Gaussian distribution):

$$\text{Loss} = \frac{1}{m}\sum_{i=1}^{m}(y - \bar{y})^2 + KL$$

where m is the number of training examples (the number of sensor readings), y is the predicted output, y is the ground truth output (equal to the input for the purposes of an autoencoder, or equal to a future input where the system attempts to minimise prediction error), and KL is the Kullback-Liebler divergence.

The encoded data E1, E2 from each node is sent to the fusion node 30 which occupies a second level within the network. The fusion node 30 is configured to combine the sensor data by mapping the encoded data E1, E2 on to a latent space for the fusion node 30 to produce combined encoded data C1. As with the sensor nodes 10, 20, the fusion node 30 implements a bottleneck with an encoder and decoder. The encoder maps the encoded sensor data E1, E2 from the first 10 and second 20 nodes onto a latent space via a bottleneck in order to produce the combined encoded data C1. This represents a compressed version of the combined information from the first S1 and second S2 sensor data.

The decoder of the fusion node 30 can decode the combined encoded data C1 to produce corresponding predications E/, E2' of the encoded sensor data E1, E2 from the first 10 and second 20 nodes. These predictions take the shared information from both sensors but represent this information in the latent space for each sensor. These predictions can then be decoded (using the decoders 14, 24 of the first 10 and second 20 nodes) to produce predicted sensor data S/, S2' for the corresponding sensors. In the present embodiment this is achieved by sending the predictions E/, E2' of the encoded sensor data back to the corresponding sensor nodes 10, 20 for decoding. Alternatively, this may be achieved through the fusion node 30 implementing copies of the decoders 14, 24 of the sensor nodes 10, 20. The fusion node itself may therefore be able to decode the predicted encoded sensor data to produce predicted sensor data.

The combined encoded data C1 may be output by the fusion node 30 for use by a monitoring system so that the monitoring system can make use of the combined data to determine an overall view of the sensor data. The monitoring system may be configured to output analysis data relating to the sensor information or determine control steps to be taken. For instance, the monitoring system might send control signals to the network based on the combined encoded data C1.

The whole system can be trained by training the encoders and decoders of the first 10 and second 20 sensor nodes and the fusion node 30 to minimise their reproduction error. This can include minimising the reproduction error of the input sensor data S1, S2 when encoding onto the combined latent space and then decoding back to the input space (through the encoders and decoders of all nodes).

In one embodiment, the system forms a generative adversarial network. In this case, each node attempts to recreate all of the input data and a discriminator (or classifier) attempts to determine whether the recreated data is the true input data or generated data. The node is trained to increase the accuracy of the generated data, and therefore, increase the classification error of the discriminator; whereas the discriminator is trained to decrease its classification error. By utilising this adversarial technique, the nodes can be trained to more accurately encode data into a latent space and decode the data to form reproductions of the data.

Whilst each node can be trained independently, additional advantages may be provided through training the whole system holistically. For instance, training operations can be run across the network of nodes. Sensor data may be input at the first level, encoded and propagated through the network of nodes. Cyclical training can be used to train across a variety of paths throughout the network of nodes. Each node implements an encoder-decoder pair with a corresponding latent space. As each node implements an encoder-decoder pair, it should be possible to encode the sensor data by passing the data up the network through a set of linked encoders and then return to the original feature space through the corresponding set of decoders. Whilst the input need not match the output (as shall be discussed later with regard to predictions after actions have been taken), the prediction error can still be tested to ensure that information was not lost through the series of encoding and decoding steps.

Accordingly, when training the system, data can be passed through the network along cyclical paths and any divergence between decoded outputs and ground-truth input values can be used as a training signal (as a quantifier of signal loss). The methods of generative adversarial networks may be used in this regard to train the system.

Taking the system of FIG. 1, the input data S1 may be encoded at the first sensor node 10 and sent to the fusion node 30 for further encoding. This may then be decoded by the fusion node 30 and the first sensor node 10 to produce decoded input S/'. A discriminator or classifier may be used to determine whether or not the decoded input S/' is equivalent to the input S1. This may be through a comparison of the two (S1 with S1") or through a machine learning system configured to determine whether a given input is a genuine input or a decoded input. The parameters of the nodes can then be updated based on the accuracy of the decoded input.

When establishing the network of nodes, the system may be trained by initially training the nodes within the first level to operate autonomously (to take actions and make predictions based only on the sensor data for their corresponding sensor). The initially trained neural networks (encoder and decoders) for the nodes in the first level can then be used as the basis for the nodes in the second level. For instance, the fusion nodes can initially be formed by copying the neural networks from their child nodes and, for instance, concatenating the neural networks (e.g. concatenating the encoders and concatenating the decoders). Following this initialisation, the nodes in the second level (the parent nodes) can then be trained to more effectively encode their received sensor
data. This process can then be repeated for the level above, continuing up until the top level has been trained.

In light of the above, data fusion can be obtained through the mapping of at least two representations of separate sensor data (in this case, the encoded sensor data E1, E2) into a combined representation C1 in a corresponding latent space. Whilst this fusion can be obtained without the encoding of data by the sensor nodes 10, 20, this extra level of encoding makes the system more efficient by compressing the data to avoid transmission overheads in the situation where sensors are distributed and so sensor data needs to be transmitted to the fusion node 30 for combination.

The sensor nodes 10, 20 may be integrated into the corresponding sensors. That is, the first sensor node 10 may be integrated into a first sensor obtaining the first sensor data S1. The second sensor node 20 may be similarly integrated into a second sensor obtaining the second sensor data S2. This may be through the addition of a specially configured processor for implementing the functionality of the corresponding sensor node, or may be through integration of software into the processor of the sensor (that is also configured to obtain the sensor data). Integrating the sensor nodes into the hardware of the sensors allows the data to be compressed before it is output by the sensor thereby increasing the efficiency of the overall system.

Whilst the embodiment of FIG. 1 shows only two sensor nodes 10, 20 and a single fusion node 30, the methods described herein may be expanded to any number of sensors, any number of levels of fusion and any corresponding network structure.

Figure 2:
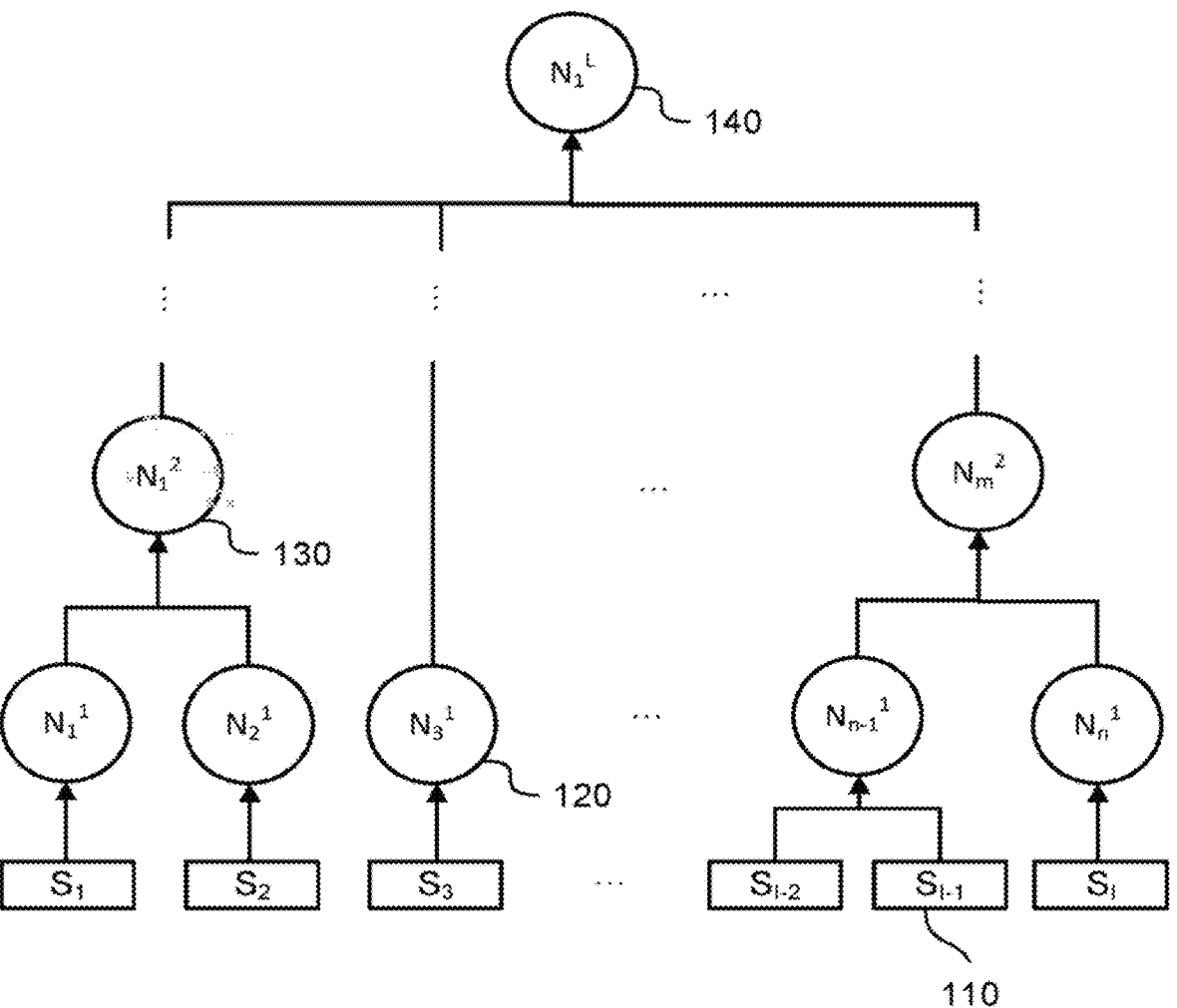
FIG. 2 shows a schematic detailing sensor fusion for a multi-level sensor-action fusion system according to an embodiment.
Figure 3:
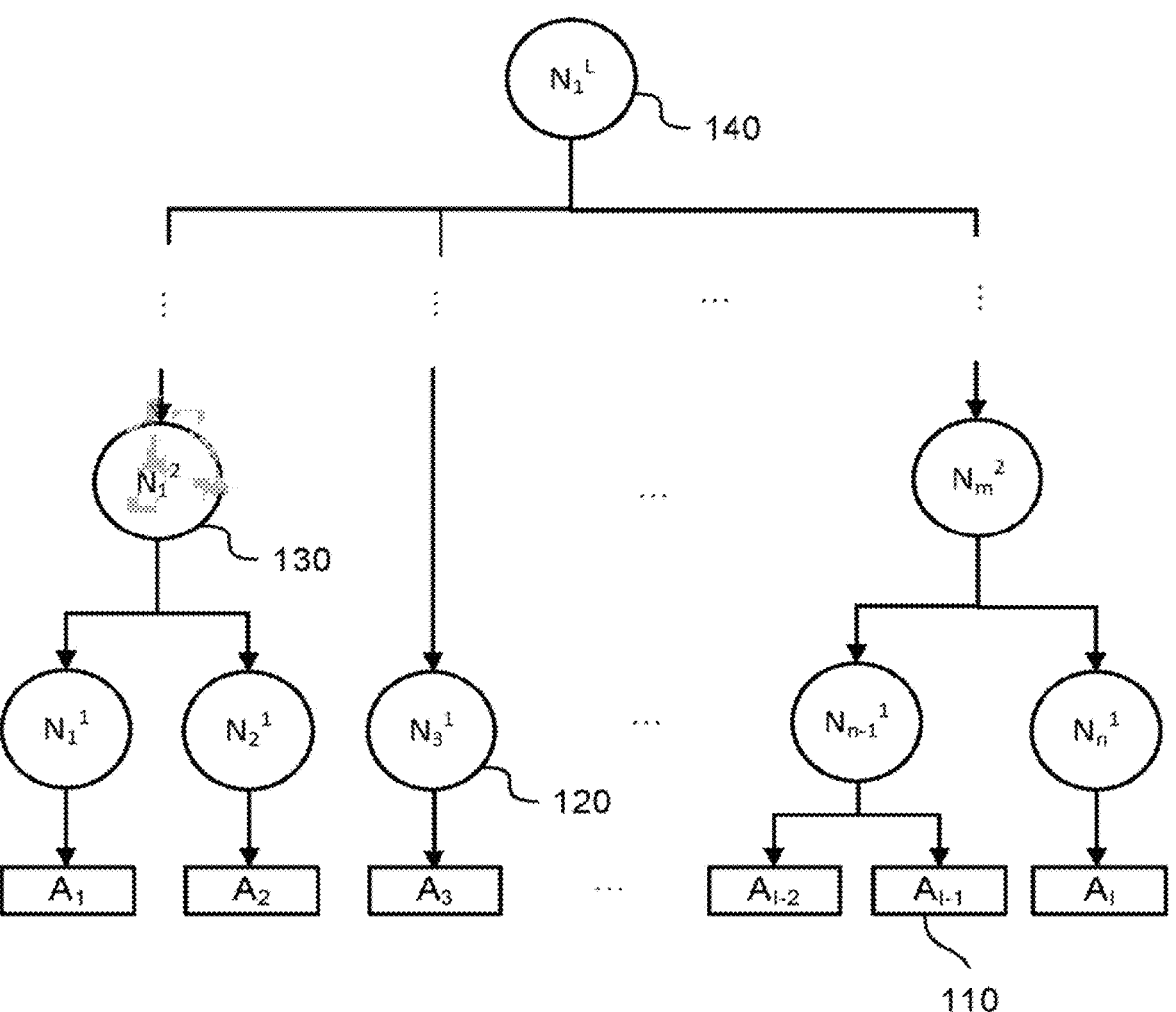
FIG. 3 shows a schematic detailing action determination for of a multi-level sensor-action fusion system according to an embodiment.

FIG. 2 shows a schematic detailing sensor fusion within a multi-level sensor-action fusion system according to an embodiment. As with the system of FIG. 1, the system is made up of a number of nodes in various levels in the form of a graph or tree structure. Each node implements an encoder-decoder pair (not shown) to provide compression and, at higher levels, to combine multiple inputs.

A set of I sensor inputs 110 {Sdi=o are input into a first level of nodes (sensor nodes 120). In the present embodiment, there are n sensor nodes. Each node is represented by its level number j and the number i of the node within the level via N/.

Each sensor node 120 receives at least one corresponding sensor input 110; however, multiple sensor inputs may be received by a single sensor node and combined in a manner similar to that described with regard to the fusion node 30 of FIG. 2 (embedding the sensor inputs into a single latent space). An example of this is shown in FIG. 2 at node $N_{-1}$. In this case, there is no need to independently encode the sensor inputs before combining them at the sensor node, but instead the sensor inputs can be mapped directly onto the embedding space.

Each sensor node 120 encodes its input(s) and outputs the encoding to the nodes 130 next level. The next level then combines the input encoding data to form one or more combinations of the encodings. These combinations are then passed up to nodes 130 in the next level for combination, and this process continues until a final top/root node 140 (on level L) is reached which combines the encodings input from the penultimate level into one coverall combination that contains a representation of information from all of the sensors 110.

The system therefore forms a network of neural networks (each node being a self-contained neural network). Various options for the arrangement of the overall network are shown in FIG. 2. For instance, data from sensor node 120 N} is not combined in the second level but is instead passed directly to a higher level for combination with one or more of the outputs a higher level (such as output(s) of the second level). Equally, more than two encodings may be combined at each node, as shown with the top/root node 140 Nf which combines multiple encodings.

Through the arrangement of FIG. 2, data can be efficiently compressed at each node and combined at various levels of generality to form various combinations of sensor information. At each level, the encoded information (the combined information) may beg output to a monitoring system. Equally, each node may store all of the relevant decoders for its descendants within the network. This allows each node to decode the data to reproduce the sensor data (translate the data back into the input space) or to make predictions for any encoded representation at any lower level within the network.

The levels may be arranged to represent various resolutions within the data, with the resolution of the sensor data decreasing up the levels. This allows the sensor data to be interrogated at various resolutions for the various control processes (e.g. lower levels controlling more specific functionality, such as the control of individual sensors or the automation of individual cars (based on a fusion of the sensor data for that car), and higher levels controlling more general functions, such as the distribution of a fleet of cars).

The above discussion relates primarily to the manner in which sensor data is reported upwards within the network for the purposes of data fusion. Having said this, the embodiments described herein also pass data back down the network (back towards the sensor nodes) in order to provide feedback for actions {Ad{$_{=1}$ to be performed based on the fused sensor data. This may be achieved by implementing machine learning agents for issuing control signals in response to the sensor data. The agents may make use of recurrent neural networks (such as recurrent autoencoders) determining actions based on the present, and on past states. Such a system may be trained via reinforcement learning.

Accordingly, one or more of the input nodes 120 not only encode and decode data but also implement machine learning agents for determining actions based on the sensor data and issuing instructions to their corresponding sensors to control the sensors to improve data acquisition. By passing sensor data back down the network, individual agents can make use of shared information across a number of sensors to make more informed decisions.

The agents may be used to improve the quality of the data acquired by the sensors. For instance, each agent may issue control signals in accordance with determined actions to control the corresponding sensors for that agent. The control signals may direct the sensor's attention (e.g. via changing resolution or changing sensing direction) in order to focus on more useful or important features. For instance, a camera may be mounted on an actuator such that the orientation of the camera may be changed. Equally, the zoom, focus (or, in general, the resolution) of the camera may be altered through control signals to the camera which can adjust this resolution by controlling the arrangement of its lenses or mirrors.

In the present embodiment, the decision regarding where to focus each sensor is made based not only on the sensor data for that individual sensor 90, but also based on additional information passed down from higher levels in the network. This allows each agent to make a more informed decision with regard to where to focus the sensor in node 140) from its corresponding parent node.

The sensor nodes 120 in the first level implement machine learning agents that control the sensors connected to each sensor node 120. Each sensor node 120 is able to issue control signals to direct the attention its corresponding sensor(s) to focus the sensor(s) on specific features (specific regions or areas within the environment being sensed).

Figure 4:
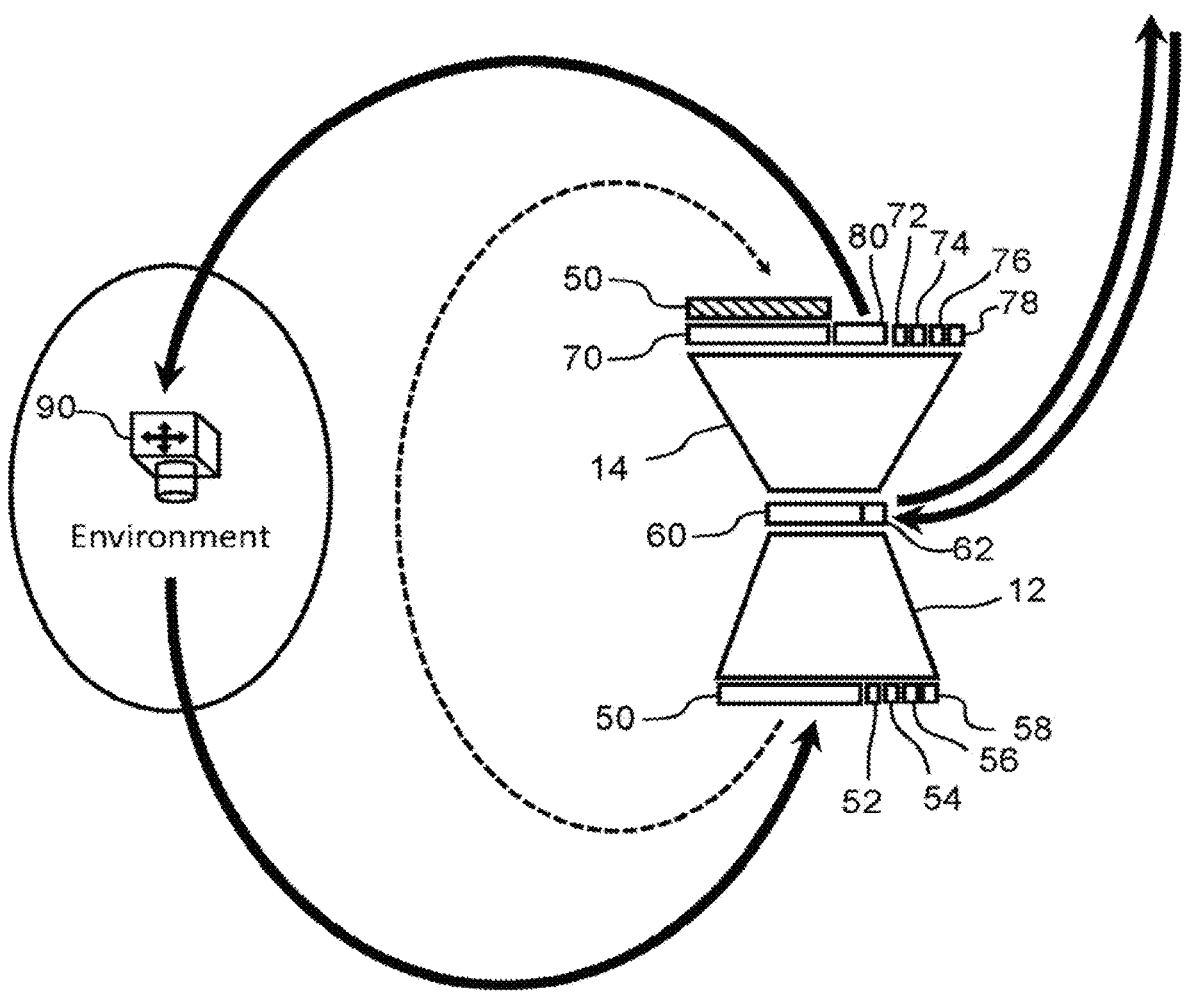
FIG. 4 shows a schematic detailing a node within a sensor fusion system according to an embodiment.

FIG. 4 shows a schematic detailing a node within a sensor fusion system according to an embodiment.

The present node is a sensor node within the first level of the hierarchical network. As described previously, the node includes an encoder 12 and a decoder 14. The node receives sensor data 50 from a sensor 90, along with a sensor identifier (ID) 54 and a time-stamp 56. The sensor ID 54 uniquely identifies the sensor. The time-stamp 56 conveys the time at which the sensor data 50 (the measurement(s)) was taken.

The encoder maps the sensor data 50 to a latent space to form encoded sensor data 60. The encoded sensor data 60 can be shared with a parent node in a higher level which, in turn, can provide predicted encoded sensor data that includes a fusion of data from a variety of sensors. This predicted encoded sensor data is decoded by the decoder 14 to produce predicted sensor data 70. The decoder also determines a predicted sensor ID 74 and a predicted time-stamp 76. That is, the decoder generates a reproduction of each input parameter. This allows the node to be trained via generative adversarial techniques to further improve its accuracy at compressing the data.

The node not only encodes and decodes data for use in sensor fusion, but also acts as a machine learning agent for controlling the sensor to improve sensor data acquisition. The agent is configured to determine an action 80 in response to the current state (e.g.

an action to adjust the configuration of the associated sensor(s) to focus on more important features within the environment). At each time-step, the node is configured to determine an action 80 based on encoded data 60 (be that the encoded sensor data from the decoder 12 or the predicted encoded sensor data from the parent node). Reinforcement learning can then be used to train the system to learn the optimal actions for various states. Whilst this embodiment relates to the determination of an action at each time-step, in alternative embodiments, an action may be determined after a predefined number of time-steps or after a certain criteria has been reached (e.g. at a specified time-step).

The actions relate to the adjustment of a configuration of one or more sensors that the given node is controlling. In one embodiment, one node controls one sensor, with shared information between sensors being obtained at higher levels within the network of neural networks.

In the present embodiment, the predicted sensor data 70 relates to the sensor data at a future time-step (such as the immediately succeeding time-step), after the determined action 80 has been implemented. In this case, the prediction error is assessed relative to the measured sensor data at the future time-step (after the action 80 has been implemented).

Whilst the node ideally makes use of the predicted encoded sensor data received from its parent node, the node can operate independently of the hierarchical network so that the sensor 90 can be controlled even when connection with the other nodes in the network has been lost. In this case, the action 80 would be based just on the encoded sensor data from the sensor 90 for that node. Having said this, the node can make more informed decisions by making use of the shared information from the other sensors. In this case, the action would be based on the predicted encoded sensor data received from the parent node. This predicted sensor data is a mapping of the shared information across the siblings for the node (the child nodes of the node's parent node) into the latent space for the node.

The agent can be implemented through a recurrent neural network. This means that the neural network can take into account the information from previous time-steps when determining an encoded representation of input sensor data. For each time-step, a hidden state is calculated and used to determine the output. The hidden state is passed to the next time-step. The time-step does not have to be fixed. The hidden state from the previous time-step is then used to condition the output (the encoding) for that time-step.

This provides some form of memory (via the hidden state) to the system to learn features (e.g. patterns) over time. This allows the agent to determine more effective actions.

The agent can be trained via reinforcement learning. That is, each time an action is determined based on an input state and the action is applied to the environment (the configuration of the sensor is adapted), an updated state is received (updated sensor data) which is then used to determine a reward (based on a reward function) or, conversely, a loss (based on a loss function). The parameters of the agent are then updated to minimise the loss or maximise the reward. The remainder of the application discusses the use of a loss function. Having said this, a reward function may equally be used (for instance, by taking the inverse of the parameters that are included in the loss function). Accordingly, for the purposes of this application, the maximisation of a reward function is considered equivalent to the minimisation of a cost function.

The system can be trained to determine the optimal actions in order to minimise an uncertainty within the system (by incorporating an uncertainty term into the loss function). Specifically, in one embodiment, the system is trained in order to minimize surprise. This may be based on the prediction error. The system may be trained in order to be biased towards an action that provides the largest decrease in prediction error. This allows the system to operate in the area between the known and the unknown and take the actions that best improve the knowledge within the system (that provide the greatest increase in knowledge/ largest decrease in prediction error).

Specifically, the node is trained to identify the prediction error in the system. The node predicts a future state (e.g. the sensor data for a future time-step such as the next time-step) and, upon measuring the actual future state (receiving the sensor data for the future time-step) determines the prediction error (the difference between the predicted state and the actual measured state).

The prediction error is included within the loss function (the cost function) so that the system is trained to minimise the prediction error. This trains the system to make more accurate predictions.

The system can be configured to find the gradient of the predication error over various actions and learn to take actions that tend towards steeper prediction error gradients. This biases the node to take actions that focus on regions of input space where the prediction error gradients/input gradient is higher. This is effectively achieved by including a corresponding term (relating to the gradient of the prediction error) in the cost function being implemented during training. This results in a system that learns to take actions that lead to the fastest rate of learning. That is, the system is biased towards actions that decrease the prediction error by the greatest amount; the system learns to take the actions that are most likely to increase the knowledge (decrease the prediction error) in the system by the fastest rate.

By optimising based on the prediction error gradients (biasing the system towards areas that provide the greatest learning), the actions in the system are biased towards regions of novelty (e.g. regions with new features less observed with higher uncertainty about their subsequent states) and/or changes in the environment (e.g. previously observed objects moving within the environment).

As mentioned previously, the agent may be implemented using a recurrent neural network. This provides some form of memory to allow the agent to take into account changes in the input over time.

Furthermore, the actions of the system can be weighted to focus on certain predefined features that may be considered more important. These features can be defined by the user. An example of a potential feature is the image of a stop-sign for an autonomous vehicle. A sensor action fusion system implemented within an autonomous vehicle can be biased to direct more attention to stop-signs as these will need to be recognised accurately for an autonomous vehicle control system to control the vehicle safely. The system may be biased in this way towards specific features through the use of a machine learning classifier.

For instance, a node may implement a classifier to determine whether a given set of features are present within the received sensor data. The future action for the node may then be conditioned on the classification. That is, a value, reward or cost function implemented by each agent (the action generator) to determine the next action may include a weighting towards predefined features that are identified as being important. Alternatively, or in addition, one or more terms may be included that bias the agent away from regions containing predefined features that are identified as not important.

Accordingly, the agent makes use of the classification of the data to implement actions to direct attention towards features of importance to the user.

The classifier for identifying specific user defined features can be trained via supervised learning based on labelled data. Classification is included within the embodiment of FIG. 4. The node receives as an input label 52 indicating the classification of the sensor data The classification may include classifications for various regions within the environment (e.g. corresponding to various coordinates in the sensor data). The node then generates a classification (a predicted label) 72 based on the sensor data 50, the encoded sensor data 60 or, preferably, the predicted encoded sensor data received from the parent node. The system is trained to minimise the classification error based on the ground truth label 52.

Once the classifier is trained, the agent utilises the classification to bias actions towards regions containing features of importance, or away from regions containing features of less importance. This is achieved by applying a weighting to the system based on the identified features. For instance, the cost function may be weighted to reward actions that focus on predefined features of importance and punish actions that focus of predefined features of lower-importance. An example of a lower-importance feature in the context of autonomous vehicles might be a section of the vehicle that the sensor is attached to (e.g. the bonnet of the car that the sensor is attached to), whilst an example of a feature of importance might be a pedestrian, another vehicle or a stop-sign.

Each classifier may be applied either to the data input into the node or to the data embedded by the node. In one embodiment, the classifier makes use of the predicted encoded sensor data obtained from the parent node. This allows the classifier to make use of the shared information between the various sensors.

Whilst the above embodiment discusses a classifier, one or more discriminators may equally be used to determine whether a given feature or set of features are present.

In addition to the above, each node is able to implement variable bandwidth control. This allows the nodes to adapt the amount of data transferred between nodes to avoid excessive transmission overheads. That is, the system can be trained to determine the amount of data that is to be transferred between nodes in order to balance latency and transmission overhead requirements against the accuracy of the system.

The amount of data that is transferred between nodes can be changed by changing the amount of compression performed by a node (e.g. the size of the latent space). To achieve this, the node receives a variable bandwidth hyperparameter 58. This defines an initial setting for the amount of data shared between the nodes. The variable bandwidth hyperparameter 5868 may be chosen by the user in accordance with the technical criteria for the system (e.g. the latency requirements and transmission overheads within the system).

The variable bandwidth hyperparameter 58 is input into the encoder 12, which generates the encoded sensor data 60. The decoder 14 determines, from the encoded sensor data 60, a bandwidth action 78. The bandwidth action 78 defines the bandwidth for the node (the amount of data to be sent to the parent node). The agent is configured to adjust the bandwidth (adjust the size of the latent space) based on a trained reinforcement learning model. The agent (via the decoder 14) outputs a bandwidth action 78. The bandwidth action 78 is an action on the bandwidth to adjust the bandwidth (adjust the size of the latent space).

The agent can learn to play-off the transmission and performance requirements of the system. This can be through the inclusion of one or parameter(s) within the loss-function that punish the transmission of large amounts of data but reward improvements in performance (e.g. improvements in prediction error).

At the next time-step, the bandwidth action 78 is enacted (the updated bandwidth is used). The node therefore shares data with the other nodes (e.g. the parent node) in accordance with the updated bandwidth and receives a response from the parent node (e.g. including the predicted encoded sensor data). The node uses this response to determine a new bandwidth action 78. This process repeats for each time-step.

Where automatic bandwidth control is implemented, the predicted sensor data 70 may be predicted based not only on the action 80 performed on the sensor but also on the bandwidth action 78 to be performed on the bandwidth.

Whilst the above embodiment discusses updating the bandwidth at each time-step, the action may be performed over any time-period, such as after a predefined number of time-steps.

By adjusting the amount of data transferred by adjusting the compression (the size of the latent space) along with the other optimisation functions (such as optimising based on prediction error), the network learns to prioritise the transfer of novelty (e.g. new, or relatively rare, features within the data) over common features.

The above embodiment relates to a node that controls how much data it transmits to a parent node. In an alternative embodiment, data is pulled up from the parent node. That is, the parent node can control how much data the child node shares. This mechanism is the same as in the above embodiment; however, the parent node determines the bandwidth (the size of the latent space) for the child node and sends this bandwidth to the child node to instruct the child node to adjust its bandwidth accordingly (adjust the size of the bottleneck for the child node).

Figure 5:
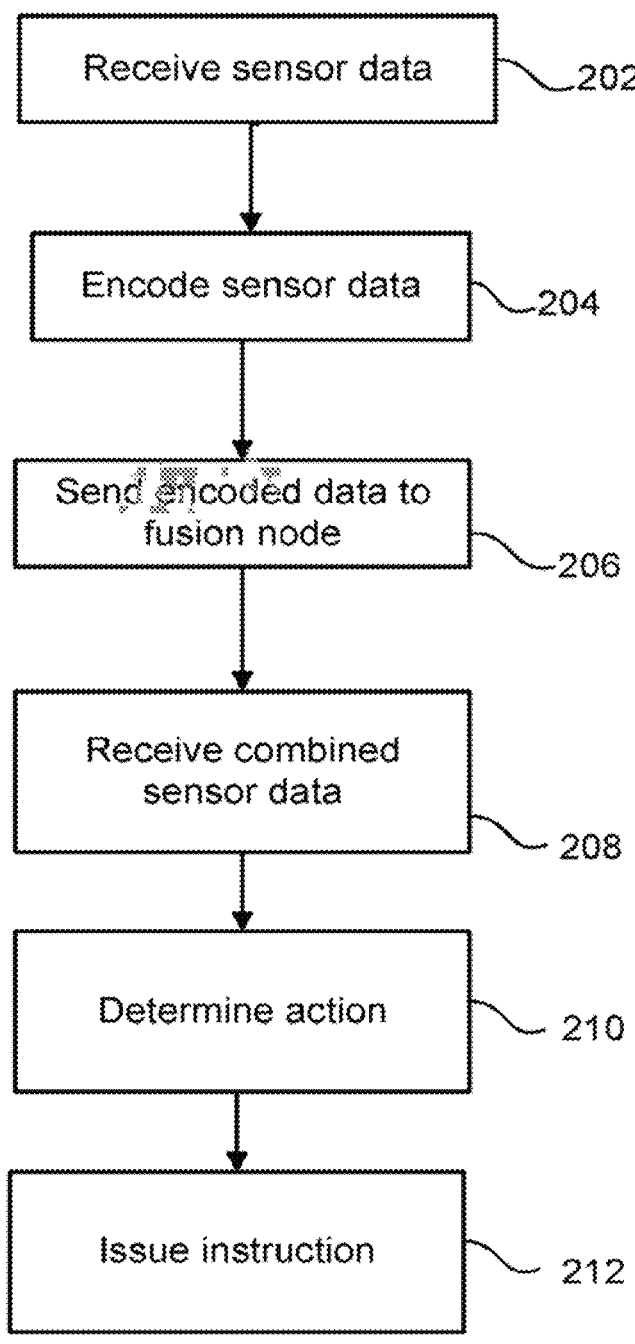
FIG. 5 shows a method for determining an action for adjusting the configuration of a sensor according to an embodiment.

Each agent is autonomous, in that it is able to take actions regardless of the actions taken by other agents in the system. Each agent takes actions based on the information that it has available to it. Accordingly, where a node loses communication with the network, it is still able to operate, but will only make decisions based on its local sensor data (the locally encoded sensor data 60), rather than any shared sensor data obtained from other nodes (the predicted sensor data from the parent node). This provides resilience within the system. FIG. 5 shows a method for determining an action for adjusting the configuration of a sensor according to an embodiment. This method may be performed by one of the nodes of the first level (the sensor nodes). In the present embodiment, the node is associated with one sensor. The node may be integrated within the sensor.

The node receives sensor data from the sensor 202. The sensor data is encoded 204 by mapping the sensor data onto a corresponding latent space. This compresses the sensor data.

The encoded data is sent 206 to a fusion node in the level above the node. This fusion node is the parent node for the present node. The fusion node is configured to combine encoded sensor data from multiple nodes by mapping each encoded sensor data onto a corresponding latent space to produce an encoded combination. This encoded combination is decoded into the latent space of the node and this decoded information is passed back to the node. This forms a recurrent configuration. The shared latent space in the fusion node supports this translation of the mutual information across the different lower-level nodes.

The node determines its action based on a policy 201. This can be trained via reinforcement learning. As mentioned above, the agent for each node may be trained by determining the action and determining predicted sensor data. The node may be trained via a parameter update method that attempts to minimize the following function F. In some embodiments, the function F includes a term derived from the gradient of a prediction-error component with respect to candidate actions.

The node determines its action based on a policy. This can be trained via reinforcement learning. As mentioned above, the agent for each node may be trained by determining the action and determining predicted sensor data. The node may be trained via a parameter update method that attempts to minimize the following function F:

$$F = x + y + z + A * (\text{error}(E)) + B * \text{predicted error}(E(E)) +$$

$$C * \text{predicted predicted error } (E(E(E))) + \ldots$$

where the parameters x, y and z are user defined cost functions over actions states and environmental states. These action states can include bandwidth control (controlling the size of the latent space). A, B and C are tuneable hyperparameters.

The node then issues an instruction to the sensor to update its configuration according to the determined action 212. The sensor makes the required changes and then obtains further sensor data using the updated configuration. This further sensor data is passed back to the node, which then implements the method of FIG. 5 again to determine combined data and determine a new action for further changing the configuration of the sensor.

By utilising data fusion to inform actions to improve data acquisition, the data obtained by the system can be improved, and the system can be better configured to focus on the most important aspects of the environment. This can provide improved resolution than would be available with each sensor independently (through data fusion) and can help the system adapt to the loss of information from various sensors (e.g. through damage or temporary loss of communication).

As discussed herein, the various nodes within the system share information to allow for better decisions to be taken by each node. Data may be pushed from one node to another or may be pulled from one node to another. Each communication link within the network of nodes may be governed by dedicated communication modules within each node. These may implement variable bandwidth control (automatic bandwidth management) in order to adjust the amount of data shared between the nodes.

Local bandwidth can be controlled by an output state of the local node which in turn may be controlled by cyclical and/or recurrent processes acting on the node. Part of the output of the node (through the decoder) is the bandwidth action that controls the amount of data that is transmitted to another node (via controlling the size of the latent space for the node). This ensures that the local and global bandwidth requirements are reduced within the network, thereby leading to a more efficient network.

Training may continue during use, such that the system continues to train itself and adapt to new scenarios by updating the parameters of the network based on new sensor data.

In addition to making use of surprise minimisation for improving data acquisition, this may also be used by the system to flag anomalies to a user. This can help determine whether there are any errors in the system and/or whether the data has been tampered with (for instance, by an intruder within the system).

Novel sensor data may be flagged for checking. This may be through the administration of a threshold (for instance, threshold prediction error). A dedicated neural network may be implemented for reviewing flagged sensor data. This may be trained to distinguish between genuine sensor data and erroneous or edited sensor data. If the data is flagged as accurate, then it is passed back to the system to further train the system. If the data is flagged as erroneous, then it can be passed to an administrator for review.

Further security improvements are provided by the fact that only encoded data is shared between nodes. As this data is encoded via machine learning techniques, it can only be decoded by a system that has the corresponding decoder. This means that the data is protected from man-in-the-middle attacks, as anyone who intercepts the communication would be unable to recover the sensor data (which may include private information) without the corresponding decoder.

In light of the above, methods and systems are presented for optimising sensor data acquisition. This may be for use with machine learning systems such as control systems for autonomous vehicles. Sensor data is shared between nodes, with data being compressed before transmission to improve efficiency. Each sensor may be provided with its own sensor node to compress data and to control its configuration. Data is fused at higher levels within the network and shared information is passed back to the bottom level to help inform actions to change the configuration of the sensors to adjust their attention/focus towards the most important features in the environment. This may be based on surprise minimisation, biasing towards predefined features of importance and biasing towards novel and/or changing features. In this way, the system is able to configure its sensors to obtain more useful information through sharing of information across the system.

Detecting Edge Cases for Use in Training Autonomous Vehicle Control Systems

Further embodiments relate to the identification of edge case scenarios for use in training autonomous vehicle control systems and/or for use in alerting a vehicle control system to potential danger.

As autonomous vehicle control systems develop, there is becoming an increasing need for better quality training data for use in training machine learning systems. Current autonomous systems are good at controlling vehicles in most day-to-day scenarios, but can be found to fail when unexpected or difficult to handle events occur. Such unexpected events are sometimes referred to as "edge cases".

Edge cases can be considered extreme conditions. Edge cases may be rare or unexpected and/or may provide difficulties that make the system likely to fail in these situations. Potential examples of edge cases for autonomous automobiles include unusual road obstacles (for instance, disguised objects), unexpected behaviour of surrounding traffic, unusual traffic, people behaving in an unusual way, extreme weather conditions or unexpected road behaviour and properties. The nature of edge cases means that they can be relatively rare.

Most modern autonomous vehicle control systems make use of machine learning. Machine learning is good at learning correlations between features based on observed training data, but is reliant on the quality of the training data. Inherently, machine learning systems will be better at adapting to environmental conditions that were present within the training data set than those that were not (or at least, were rarely represented) in the training data set.

It is important for the safety and reliability of these systems that they are able to effectively handle any environmental condition that they encounter. Accordingly, there is a need for improved methods for identifying extreme or potentially dangerous environmental conditions for use in simulators and in training machine learning systems to better adapt to these situations. By identifying these edge cases, these can be filtered out from the non-edge case data and passed to a training system to train a machine learning system to improve its performance in these edge cases.

The levels of autonomy of a system can be classified from a scale running from zero to five, with zero being no autonomy (completely driver controlled) and five being full autonomy (absolutely no control from a human driver).

Many vehicles that are currently available are equipped with some form of autonomous control, generally level two automation. This partial automation can include assistance in steering, braking and/or acceleration but requires the driver to be constantly alert and ready to take back control at any time. Level two systems are often equipped with many sensors for enabling the system to sense the environment and control the vehicle.

The data acquired by these sensors can be used as training data for further improving autonomous control systems. Having said this, it would be inefficient and expensive to report back 100% of sensor data acquired by vehicles within a fleet. Not only would this cause a significant power and bandwidth drain on the vehicles, but it would also require unfeasibly large data storage capacity to collect. There is therefore a need to more effectively identify the data that is most useful for training autonomous vehicles.

To solve this problem, the embodiments described herein implement a system for use within a vehicle that monitors the sensor data and identifies surprising environmental conditions.

This is achieved through a machine learning model which makes predictions of future environmental conditions and determines the corresponding prediction error. The model may be a full or scaled-down copy of an autonomous vehicle control system that is the subject of further development. Alternatively, or in addition, the model may work alongside a full or scaled-down copy of an autonomous vehicle control system, receiving prediction errors from the autonomous vehicle control system.

Where there is a large divergence in the predicted environment and the observed environment (i.e. where there is a large prediction error), then the system detects this divergence (e.g. detects an edge case) and reports or logs details of the environmental condition for use in training.

The system may either store the details locally for uploading or analysis at a later time or may immediately report the details to a central server for further processing.

The identified edge case may then be combined with other environmental data (e.g. other identified edge cases) for use in training an autonomous vehicle control system to make better predictions in such scenario(s) and therefore more safely adapt to the corresponding environmental conditions.

In addition, or alternatively, the identification of an edge case can also be used to alert a vehicle control system to a potentially dangerous situation. An edge case is indicative of a situation in which a driver (or other type of vehicle controller) or a vehicle control system (such as an autonomous vehicle control system) might have difficulties. By alerting a vehicle control system of the presence of an edge case, the vehicle control system can be put on alert and can use this information to decide to take remedial action to mitigate any risk. Remedial action may include priming brakes or steering for emergency use or actively issuing driving controls, such as braking and steering, to avoid danger.

The system may work within a network of neural networks similar to that described above with reference to FIGS. 1-6. For instance, a compressed representation of the environment may be reported to a higher level which may decode the representation to recreate the environment. The decoded information describing the environment may then be input into a simulator to recreate the edge case scenario. An autonomous vehicle may then be trained in this simulator to improve performance for this edge case.

Figure 6:
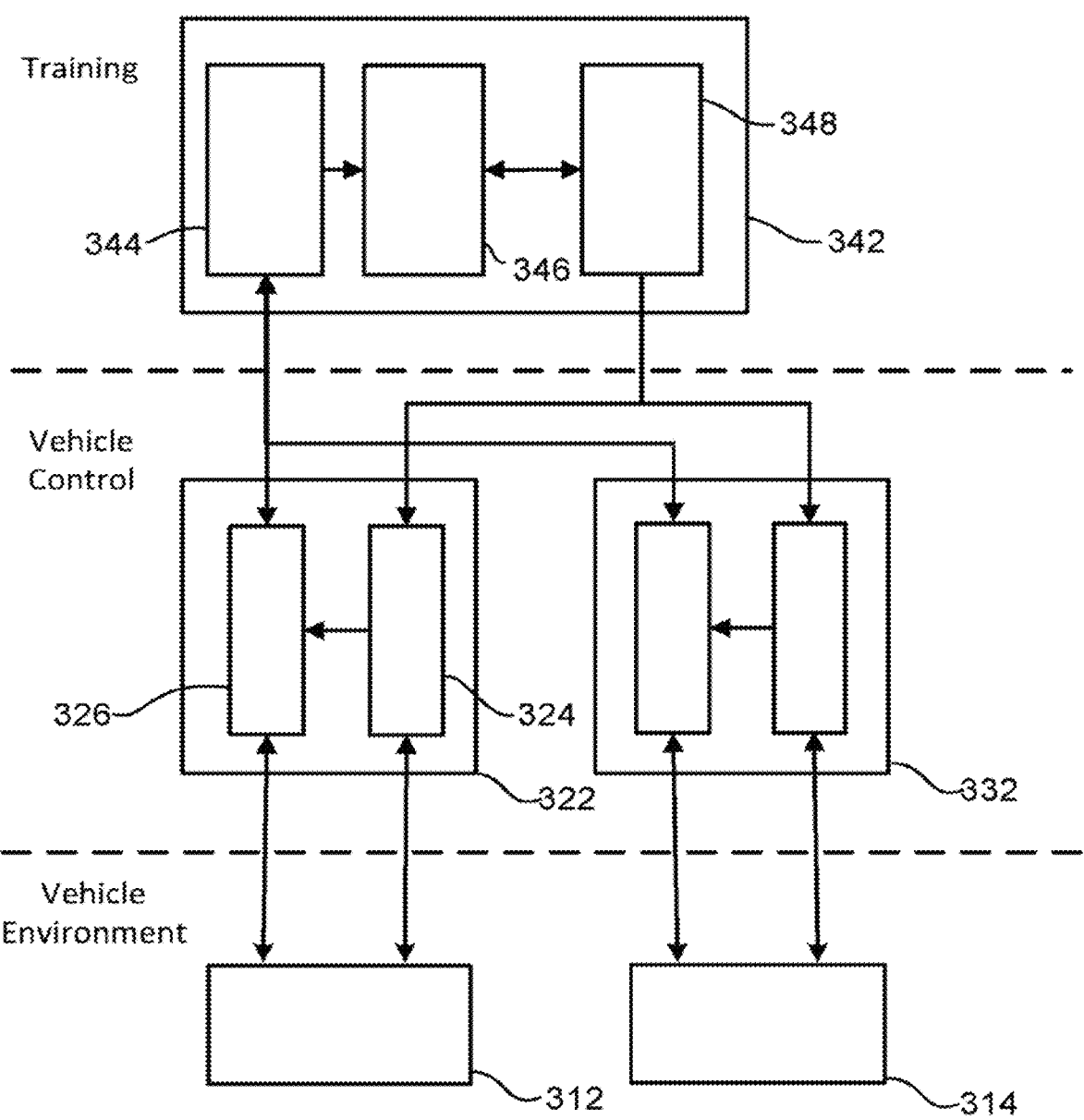

FIG. 6 shows a system for detecting edge case scenarios for use in training an autonomous vehicle control system in accordance with an embodiment.

As with the systems of FIGS. 1-5, the system of FIG. 6 is distributed over multiple levels. This includes the vehicle environment level, the vehicle control level and the training level.

The vehicle environment includes a vehicle system 312, 314 for each vehicle being controlled. Each vehicle system 312, 314 includes sensors for sensing the environment around each vehicle and the various vehicle subsystems that are being controlled.

The vehicle subsystems receive control inputs from one or more of the driver of the vehicle (where the vehicle has a driver) and the vehicle control level to control the vehicle. This may include controlling the motion of the vehicle (e.g. via acceleration, breaking, steering, etc.) and may include further aspects, including the sensor data acquisition (as described with reference to FIGS. 1-5) and other secondary systems, such as safety systems such as airbag and seatbelt control.

The sensors sense the vehicle environment. This includes not only the environment around the vehicle (including other vehicles and obstacles surrounding the vehicle), but may also include the internal environment of the vehicle. The internal environment may include the status of various subsystems as well as any actions that are taken by a driver of the vehicle and/or an autonomous vehicle control system for the vehicle.

The vehicle environment reports sensor information detailing information about the vehicle environment up to the corresponding vehicle control system 322, 332 for that vehicle. Each vehicle control system 322, 332 is carried in the corresponding vehicle and controls the various subsystems of the vehicle. Each vehicle control system 322, 332 includes an autonomous vehicle control system 324 and an edge case module 326. The autonomous vehicle control system 324 and edge case module 326 may be implemented in a single computing device (e.g. on a single processor), or may be implemented on separate computing devices that interact with one another.

The autonomous vehicle control system 324 receives sensor data from the vehicle environment and determines control actions to be performed by the vehicle subsystems. This may include actions for autonomously driving the vehicle or for assisting the driver in driving the vehicle (for instance, alerting the driver to obstacles or adjusting responsiveness of various control subsystems, such as breaking, acceleration or steering in preparation for driver action).

The autonomous vehicle control system 324 sends instructions to the various vehicle subsystems to control the subsystems to perform the actions determined by the autonomous vehicle control system 324.

The autonomous vehicle control system 324 also reports information to the edge case module 326. The edge case module 324 monitors the vehicle environment as well as any actions taken by the autonomous vehicle control system 324. The autonomous vehicle control system 324 may report its determined actions/instructions as well as prediction errors to the edge case module 326. Prediction errors are the difference between the predicted environment (as determined by the respective model) and the sensed environment.

The edge case module 326 also models the vehicle environment and makes predictions of the future state of the environment. This may utilise a similar bottleneck architecture to that shown in FIG. 3, where inputs are encoded into an encoded feature space and decoded to reproduce the inputs, generate predicted actions and predict future inputs (e.g. a future environment state) with the prediction error (the difference between reproduced and measured inputs) being minimized during training. In this case, the inputs may include environment information, any actions taken by the vehicle control system 324 and any prediction errors reported to the edge case module 326 by the vehicle control system 324.

By attempting to recreate the inputs through the bottleneck architecture, the edge case module 326 can build up a model of the environment and a model of how the autonomous vehicle control system 324 responds to the environment (via the input actions and prediction errors). By predicting the prediction error for the autonomous vehicle control system 324, the edge case module 324 learns to predict scenarios when the autonomous vehicle control system 324 will fail. Having said the above, reproduction of inputs is not necessary, provided that the edge case module 326 is able to predict environment data for a future time step.

By outputting predicted inputs for a future time, the edge case module 326 is able to detect when inputs differ significantly from those predicted. Where there is a significant difference (a prediction error that exceeds a threshold), then the edge case module 326 determines that an edge case has been detected, and outputs information regarding the edge case scenario to the training level. This determination may be made based on a combination (e.g. a weighted sum) of prediction errors, each prediction error relating to a different prediction made by the vehicle control system 322, 332.

An example of a significant edge case scenario may be where the predicted external environment (e.g. relative location and/or trajectory of obstacles or other vehicles) for a future time differs significantly from that measured. This means that the environment is behaving in an unexpected manner. A further example is where the driver's actions (as measured within the vehicle environment) or the actions taken by the autonomous vehicle control system 324 significantly differ from those predicted. This means that the driver or the autonomous vehicle control system 324 are behaving in an unexpected manner.

As mentioned above, the edge case module 326 may not only reproduce the inputs (including any actions taken by the autonomous vehicle control system 324) but may also output its own action(s). These may include remedial actions in an attempt to mitigate any damage or cost from the edge case occurring. This might include priming, activating, or adjusting the settings for various vehicle control subsystems. For instance, the edge case module 326 may prime a braking system (e.g. by activating an antilock braking system or increasing brake sensitivity) to allow the driver to brake more effectively. Alternatively, or in addition, other subsystems may be adjusted or primed, including pre-emptively activating lights or indicators (such as brake lights, emergency indicators, turning indicators, etc.), adjusting (increasing or decreasing) driving light brightness, adjusting suspension (e.g. increasing or decreasing stiffness, adjusting balance, etc.), charging capacitors or changing sensitivity of the brake(s) or steering. The edge case module 326 reports information regarding edge case scenarios to the training level. The information reported to the training level comprises a compressed representation of the edge case scenario. As with the system of FIGS. 1-5, this is the encoded representation of the inputs received by the edge case module 326 which caused the prediction error to exceed the threshold.

The training level includes a training server 342 including an edge case analysis module 344, a simulator 346 and an autonomous vehicle control system training module 348. The edge case analysis module 344 receives edge case information from each vehicle control system in the fleet and for each edge case, decodes the received compressed representation of the edge case scenario and creates a set of parameters for controlling the simulator 346 to recreate the edge case scenario. The decoded edge cases collected from across the fleet are mapped to the relevant API controls for generating scenarios in the simulator 346. The edge case analysis module 344 then inputs these parameters (the API controls) into the simulator 346 to produce a simulation of the vehicle environment during the edge case.

The autonomous vehicle control system training module 348 inputs the current model for the autonomous vehicle control system 324 into the simulator 346 and trains the model to improve performance when responding to this edge case. The model may be trained through reinforcement learning to improve the safety of the system and reduce the prediction error.

Once an updated model for the autonomous vehicle control system 324 has been determined through training, the updated model is then sent to the vehicle control systems 322, 332 for use in controlling the respective vehicles for future scenarios.

The edge case analysis module 344 may be configured to review and compare a number of edge cases to determine whether there are any linking factors between the edge cases. For instance, it may become apparent that the vehicle control systems 324 across a fleet of vehicles repeatedly fail to correctly register stop signs in particular weather conditions. By identifying features that are shared by a number of edge cases, the edge case analysis module 344 may be extended to generate additional synthetic edge cases which include the shared feature(s) for use in further training the autonomous vehicle control system 324.

The edge case analysis module 344 is also configured to train the edge case modules 326 across a fleet based on the edge case information reported to it. This training methodology can be similar to that discussed with regard to FIGS. 1-5. The edge case analysis module 344 can then send the updated model for the edge case modules 326 to the vehicle control systems 322, 332 across the fleet.

The system of FIG. 6 represents the control and training of vehicle control systems across a single fleet. Multiple fleets may be controlled and trained using this methodology. Where different fleets utilise different models for their autonomous vehicle control systems, these multiple fleets might either report to a single training server 344, or to separate training servers 344 (e.g. one for each fleet). These servers may then, in turn, report analysis data up to a central server for analysis of trends between fleets.

Figure 7:
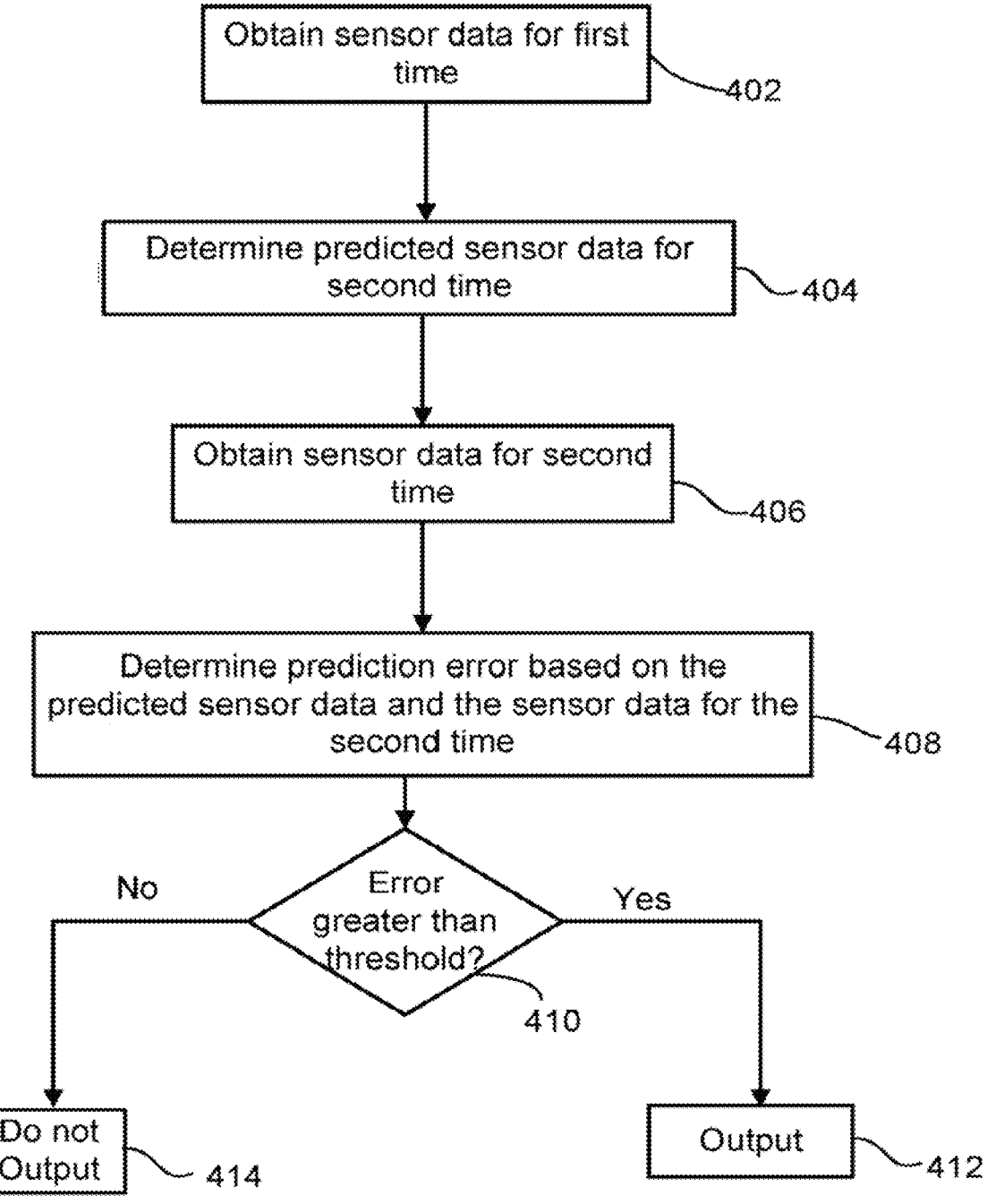
FIG. 7 shows a method for detecting edge cases in accordance with an embodiment.

FIG. 7 shows a method for detecting edge cases in accordance with an embodiment. This method may be performed by one of the edge case modules shown in FIG. 6.

Sensor data is obtained for a first time 402. The sensor data may comprise one or more sensor measurements describing the vehicle environment at least at the first time. The sensor data need not represent a single point in time, but may represent a period of time including the first time. This can be obtained, for instance, by encoding sensor measurements obtained across the period of time into a single encoding (e.g. in Fourier space). For instance, the encoding may represent the relative trajectories of vehicles or objects surrounding the vehicle being controlled. Accordingly, the sensor data may be an encoded and potentially compressed representation of the vehicle environment at the first time.

The sensor data may include one or more measurements of the internal state of the vehicle and may include one or more measurements of actions being performed by the driver (e.g. steering, braking, accelerating, etc.).

The sensor data may be obtained through direct control of the sensor(s) by the edge case module or through passive receipt of the sensor data from the sensors or from one or more intermediary systems.

Sensor data is then obtained for the second time 406. As with the sensor data for the first time, the sensor data for the second time (and the corresponding predicted sensor data) need not be limited to the second time, and could relate to a period of time including the second time.

A prediction error is then determined based on the predicted sensor data and the (observed) sensor data for the second time 408. The prediction error may be a difference between the predicted and observed sensor data, a mean squared difference, or any other form of error when comparing the predicted and observed sensor data. Each set of predicted and observed sensor data (and other associated control data) for a given point in time may be considered an event.

The method then determines whether the prediction error is greater than a threshold 410. The threshold may be predefined and may be either constant or be adapted based on system performance (e.g. to output a set percentage or proportion of events as edge cases).

If the prediction error is greater than the threshold, then the event is deemed to be an edge case and information relating to the edge case is output 412. In one embodiment, this information comprises a compressed representation of the sensor data, the predicted sensor data and any associated control data (such as actions taken by the autonomous vehicle control system 324 and any associated prediction errors for the autonomous vehicle control system 324) for the second time and may include corresponding data for earlier points in time as a record of the events that lead to the edge case. The system may also output data with regard to later points in time as a record of the result of the edge case.

The information is output to the training server 342 for use in further training the autonomous vehicle control system 324 to perform better in similar edge cases (and potentially to train the edge case module 326 to better predict edge cases).

If the prediction error does not exceed the threshold, then the event is not output 414.

In either case, the method may iteratively repeat. For instance, the method may then return to step 404 to determine a prediction for the next time step. In this case, the "second time" would be the next time step (the third time) and the method would continue, iteratively obtaining sensor data, making predictions for a later time step, and then determining a prediction error based on observed sensor data at that later time step.

In summary, embodiments described herein are able to identify edge case events where an autonomous vehicle control system may fail and output information regarding these events to a training server for improving performance in these specific events.

This is achieved by implementing a neural network configured to map input environment data for a first time step to predicted environment data for a later time step. The environment data may include sensor data and feedback data from the autonomous vehicle control system, such as actions by the autonomous vehicle control system and prediction errors output by the autonomous vehicle control system. In one implementation, the neural network has a bottleneck architecture configured to form an encoded representation of the input data. The encoded representation may be decoded to output predicted environment data for a future time step.

Figure 8:
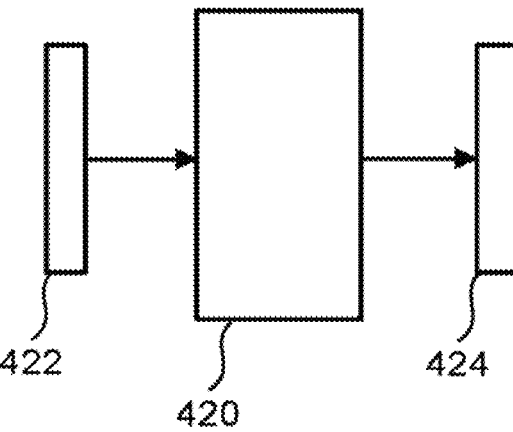
FIG. 8 shows a schematic detailing a neural network for identifying edge cases according to an embodiment.

FIG. 8 shows a schematic detailing a neural network for identifying edge cases according to an embodiment.

The neural network 400 includes a set of layers that are configured to map an input to an output. In this case, the neural network receives environment data 422 as an input and generates predicted environment data 424 as an output. The input environment data 422 may comprise sensor data describing the vehicle environment. The sensor data might include multiple sensor measurements from multiple sensors and may be encoded and/or compressed. The neural network may also receive one or more sensor identifiers (ID) (one for each sensor) and a time-stamp. The sensor ID uniquely identifies the corresponding sensor. The time-stamp conveys the time at which the sensor data (the measurement(s)) was taken.

The neural network 420 may also receive and encode an input label indicating a classification of the sensor data and a bandwidth hyperparameter.

The sensor data may include not only measurements of the external environment around the vehicle, but also measurements relating to the internal environment (e.g. the status and/or calibration of any vehicle subsystems) and any actions being taken by the driver at that time (e.g. accelerating, braking, steering, etc.).

The node may also receive, as part of the environment data 422, action(s) instructed by the autonomous vehicle control system 324 and any prediction error(s) 66 output by the autonomous vehicle control system 324 with regard to predictions being made by the autonomous vehicle control system 324. This allows the system to make predictions for when the prediction error for the autonomous vehicle control system 324 might increase, thereby indicating a potential edge case. Furthermore, basing the predictions on actions of an autonomous vehicle control system 324 or the driver allows the system to predict future actions which may be indicative of an edge case and/or an emergency.

The neural network 420 may map the inputs to a latent space to form encoded environment data. The encoded environment data can be shared with a parent node in a higher level, based on whether an edge case is detected. The encoded environment data may be decoded by the decoder. The neural network can be trained to reproduce the inputs and/or to produce predicted environment data for the next time step that will occur at the input. The decoder may generate a reproduction of each input parameter. This allows the node to be trained via generative adversarial techniques to further improve its accuracy at compressing the data.

In the present embodiment, the predicted environment data relates to the environment data for a future time-step (such as the immediately succeeding time-step). At each time step, the node determines the prediction error based on the difference between the predicted environment data for that time step and the measured environment data for that time step. Where the prediction error exceeds a threshold, the data relating to that prediction is output. This data may include one or more of the following information: the encoded environment data for the time step that produced that prediction, any encoded environment data for one or more time steps succeeding the prediction, any encoded environment data for one or more time steps preceding the prediction, the latent space that resulted in the prediction, and the error in the latent space. The choice of which information to be output may depend on bandwidth constraints of the system.

The node may be trained to place a greater importance (weight) on encoding specific features of the environment, hence the prediction error can be thought to encode prediction errors associated with these specific features. These specific features could be of the features of the environment, the behaviour of the car, the driver and autonomous driving system and/or the errors and prediction errors coming from the autonomous driving system received as input to the node. For instance, the environment data may include information detailing one or more actions of the driver, and one or more trajectories of objects in the vicinity of the vehicle (e.g. static obstacles or other moving objects such as other vehicles or pedestrians) and the encoder may be trained to selectively encode some information over other information (e.g. through relative weightings).

The neural network may be configured to place a greater emphasis (weight) on prediction errors associated with one or both of these specific features. In addition, a greater weight may be applied with regard to inputs from an autonomous vehicle control system 324. This may be either a prediction error output by the autonomous vehicle control system 324, or when trained in reproduction mode not prediction mode it would be on the neural network's reproduction of the input prediction error from the autonomous vehicle control system 324, or it may be a weight applied directly to the prediction error input from the autonomous vehicle control system 324. The latter may be used to place greater emphasis on events that cause the autonomous vehicle control system 324 to fail, even when the neural network itself is accurately predicting events.

The neural network not only makes predictions for use in identifying edge cases, but can also act as a machine learning agent for alerting or controlling various subsystems of the vehicle in anticipation of potential danger. The specific embodiment of controlling sensors for improving sensor data acquisition has been discussed with regard to FIG. 4. Furthermore, the neural network may be configured to alert the autonomous vehicle control system 324 to prepare for an edge case or predicted danger, or to control other subsystems, such as a braking control system, an acceleration control system, a steering subsystem, etc.

For instance, in response to the prediction error of the system exceeding a threshold, the system (the neural network 420) may output an alert to the autonomous vehicle control system 324. This alert may simply be an indication that an edge case has been detected, or may include additional information, such as the nature of the edge case and/or features of the environment that may have caused the edge case. For instance, where the neural network 420 is making multiple predictions, the neural network 420 may identify a specific prediction and an associated feature that caused the prediction error to exceed the threshold. This can then be utilised by the autonomous vehicle control system 324 to take remedial action, for instance, brake or turn to avoid an object in the environment that has been identified as dangerous.

Alternatively, instead of alerting an autonomous vehicle control system 324, the neural network 420 may issue alerts or commands to other subsystems, such as a braking control system, an acceleration control system, a steering subsystem, etc. to either adjust configurations of these subsystems (e.g. to make the brakes or steering more sensitive) or to take explicit action (e.g. to brake or turn).

Any alerts or instructions can be biased towards anticipating driver actions (e.g. priming systems to more effectively operate in anticipation of specific driver actions, such as adjusting brake sensitivity in anticipation of the driver braking, or the actions of an autonomous vehicle control system), and/or could be biased towards safety and avoiding collisions (based on predicted object trajectories in the vicinity of the vehicle).

In addition or alternatively to basing the alert on prediction error, the system may issue an alert based on the predicted environment data. For instance, an alert might be issued in response to determining that the predicted environment data indicates a predicted environmental state associated with danger. This might include one or more detected features in the data that are classified as dangerous or otherwise indicative of potential danger (e.g. obstacles, specific road signs (such as stop signs), pedestrians, other vehicles predicted external vehicle or obstacle trajectories that are predicted to collide or come within a certain threshold of the vehicle, etc.).

Furthermore, the predicted environment data might include predicted actions by the driver or autonomous vehicle control system. The system may be configured to identify an emergency action such as an emergency brake or emergency steering and to issue an alert in response to such a detection. An emergency brake or emergency steering might be a brake or steering exceeding a corresponding threshold level of braking or steering (e.g. a corresponding acceleration).

In light of the above, the neural networks can be adapted to improve vehicle safety and to identify edge cases for use in training autonomous vehicle control systems.

It has been found that, by flagging up edge cases utilising the methodology described herein, the performance of an autonomous vehicle control system can be trained using up to $1/19^{th}$ of the training data that would otherwise be required. This is because the autonomous vehicle control system is primarily trained on edge cases, which provide the greatest change in performance when used in training.

The neural network edge case model may also output one or more actions to be taken, e.g. emergency actions such as adjusting attributes of various vehicle subsystems (such as braking, steering, lights, acceleration, etc.). This allows the system to take actions to ready the vehicle control subsystems to avoid damage or collisions.

Whilst the embodiments described herein discuss sensor and environment data (and encoded representations thereof) for specific times, this data may also represent data measured or otherwise accrued over a period of time.

Whilst the above embodiments describe determining when to output data relating to a vehicle environment, this need not be a binary decision. Instead, embodiments may output an increased amount of information about the vehicle environment in response to detecting an edge case, but may continue to output information about the vehicle environment even where no edge case is detected. This continued output might be at a reduced resolution, but may still be used for analysis of trends and/or for use with the sensor action fusion methodology discussed with regard to FIGS. 1-5. Accordingly, embodiments might output information regarding the vehicle environment even when no edge case is detected, but an increased amount (e.g. increased resolution or bandwidth) might be output when an edge case is detected.

Figure 9:
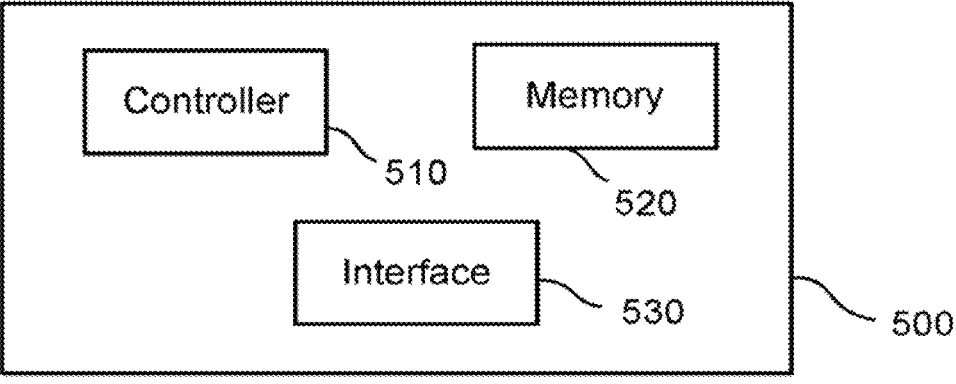
FIG. 9 shows a computing system for performing the methods described herein.

FIG. 9 shows a computing system for performing the methods described herein. The system 500 comprises a controller 510, memory 520 and an interface 530. The controller is configured to perform the methods described herein based on executable code stored in the memory 520. The memory 520 may be volatile or non-volatile memory. The interface 530 is configured to receive inputs from external systems and output information to external systems.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

What is claimed is:

1. A multi-sensor system for predicting a presence of two or more predefined features of interest in an environment comprising first and second regions which at least partially overlap with each other, the system comprising:
    a first sensor processor configured to receive, from a first sensor, first sensor data corresponding to a first plurality of sensed features detected in the first region by the first sensor, and to perform a first compression on the first sensor data to form encoded first sensor data that is smaller in size than the first sensor data, wherein the first sensor comprises a camera;
    a second sensor processor configured to receive, from a second sensor, second sensor data corresponding to a second plurality of sensed features detected in the second region by the second sensor, wherein the first and second pluralities of sensed features at least partially overlap with each other, and to perform a second compression on the second sensor data to form encoded second sensor data that is smaller in size than the second sensor data;
    a fusion processor configured to fuse the encoded first sensor data and the encoded second sensor data to form fused sensor data, to perform a third compression on the fused sensor data to form encoded fused sensor data, and to identify first and second predefined features of interest within the encoded fused sensor data;
    a network configured to exchange at least the encoded first sensor data and the encoded second sensor data between the first sensor processor, the second sensor processor, and the fusion processor, wherein
        at least one machine learning technique is used to train the multi-sensor system to minimize a cost function comprising (i) a first parameter that reduces a size of the at least one of the encoded first sensor data, the encoded second sensor data, and the encoded fused sensor data, and (ii) a second parameter that reduces a prediction error associated with at least one of said first and second identified predefined features of interest;
        said training causes the multi-sensor system to perform one or more sensor-configuration actions selected to collect at least one of the first sensor data and the second sensor data that is expected to reduce the prediction error associated with one of the first and second identified predefined features of interest, the one of the first and second identified predefined features of interest being determined, by the multi-sensor system, to have higher prediction uncertainty than the other of the first and second identified predefined features of interest; and
        said one or more sensor-configuration actions are performed, before new first sensor data is received by the first sensor processor, by adjusting a resolution of the first sensor, adjusting a focus of the first sensor, or changing an orientation of the first sensor so that the first sensor senses the second region;
    wherein at least one feature of the second plurality of sensed features is not directly detectable by the camera operating alone, and the camera changes its orientation based on the second plurality of sensed features, and
    wherein the cost function further comprises a term dependent on a gradient of a prediction-error component of the cost function with respect to candidate ones of the sensor-configuration actions, and said training further causes the camera to change its orientation based on the gradient-dependent term to reduce the prediction-error component subject to other terms in the cost function.

2. The multi-sensor system of claim 1 wherein the prediction error associated with the first identified predefined feature of interest comprises: a difference between a past state of said first identified predefined feature of interest at a less recent point in time and the state of the first identified predefined feature of interest at a more recent point in time.

3. The multi-sensor system of claim 1 wherein the first compression of the first sensor data is achieved using a sparse encoder.

4. The multi-sensor system of claim 1 wherein the multi-sensor system changes only one or both of the first compression and third compression.

5. The multi-sensor system of claim 1 wherein the multi-sensor system trains only one or both of the first sensor processor, to change the first compression, and the fusion processor, to change the third compression.

6. The multi-sensor system of claim 1 wherein the first compression is performed by forming encoded first sensor data based on a third plurality of encoded features that is smaller in number than the first plurality of sensed features and the second compression is performed by forming encoded second sensor data based on a fourth plurality of encoded features that is smaller in number than the second plurality of sensed features.

7. The multi-sensor system of claim 1 wherein the third compression is performed by forming encoded fused sensor data based on a fifth plurality of encoded features that is smaller in number than the sum of the first plurality of sensed features and the second plurality of sensed features.

8. The multi-sensor system of claim 1 wherein the fifth plurality of encoded features is defined at least in part by not including therein one of the first plurality of sensed features and one of the second plurality of sensed features that overlap with each other.

9. The multi-sensor system of claim 1 where in control signals cause the first sensor to perform the sensor-configuration actions so as to reduce the prediction error.

10. The multi-sensor system of claim 1 wherein the first compression is performed by mapping the first sensor data occupying a first sense feature space to the encoded first sensor data occupying a first latent feature space, wherein the first latent feature space encodes a learned and controllable translation in time, space or level of abstraction of the first sensed feature space, and the second compression is performed by mapping the second sensor data occupying a second sense feature space to the encoded second sensor data occupying a second latent feature space, wherein the second latent feature space encodes a learned and controllable translation in time, space or level of abstraction of the second sensed feature space.

11. The multi-sensor system of claim 1 wherein the third compression is performed by mapping the encoded first sensor data and the encoded second sensor data occupying a combined latent feature space to the encoded fused sensor data occupying a multi-sensor latent feature space, wherein the multi-sensor latent feature space encodes a learned and controllable translation in time, space or level of abstraction of the combined latent feature space that provides a combined view of the environment.

12. The multi-sensor system of claim 11 wherein the combined view of the environment is encoded into a combined latent representation, and wherein said training applies the at least one machine learning technique to the combined latent representation to compute the prediction errors associated with the cost function.

13. The multi-sensor system of claim 1 wherein the multi-sensor system occupies a first region, and further comprising a controller configured to receive both the encoded fused sensor data and a second-region encoded fused sensor data from a different multi-sensor system, and combine the encoded fused sensor data and the second-region encoded fused sensor data to form regional encoded fused sensor data, and wherein the multi-sensor system further analyzes the regional encoded fused sensor data.

14. The multi-sensor system of claim 1 wherein the multi-sensor system minimizes the prediction error associated with at least one of said identified predefined features of interest within the encoded fused sensor data, by measuring the encoded sensor data corresponding to the at least one of said identified predefined features of interest, and calculating a difference between the measured encoded sensor data and another version of the measured encoded sensor data that was estimated by the multi-sensor system at a previous time.

15. The multi-sensor system of claim 1 wherein the one of the first and second identified predefined features of interest that is determined, by the multi-sensor system, to have higher prediction uncertainty corresponds to a larger change in the environment with respect to time than the other of the first and second predefined features of interest.

16. The multi-sensor system of claim 1 wherein the one of the first and second identified predefined features of interest that is determined, by the multi-sensor system, to have higher prediction uncertainty corresponds to a feature that is identified with higher uncertainty than the other of the first and second predefined features of interest.

17. The multi-sensor system of claim 1 wherein the first sensor is a camera comprising lenses, and said adjusting of the resolution of the first sensor occurs by controlling the arrangement of said lenses.

18. The multi-sensor system of claim 1 wherein the first sensor is a camera comprising an actuator, and said adjusting of the first sensor to sense the second region occurs by using the actuator to change the orientation of the camera.

19. The multi-sensor system of claim 1 wherein the first sensor is a camera configured with a first angle and a first resolution, the second sensor is a camera configured with a second angle narrower than the first angle and a second resolution higher than the first resolution, wherein the one of the first and second identified predefined features of interest determined to have higher prediction uncertainty is in the second region, and control signals adjust the first sensor to focus on the second region.

* * * * *